United States Patent [19]

Someya et al.

[11] Patent Number: 5,267,348
[45] Date of Patent: Nov. 30, 1993

[54] METHOD AND SYSTEM FOR EVALUATING AND MODIFYING FUZZY KNOWLEDGE

[75] Inventors: Ryuko Someya, Kawasaki; Michitaka Kosaka, Sagamihara; Hirotaka Mizuno, Ikeda; Toshiro Sasaki, Yokohama; Satoru Suemitsu, Kawasaki, all of Japan

[73] Assignee: Hitachi, Ltd., Tokyo, Japan

[21] Appl. No.: 664,628

[22] Filed: Mar. 4, 1991

[30] Foreign Application Priority Data

Mar. 9, 1990 [JP] Japan .................................. 2-056356
Oct. 17, 1990 [JP] Japan .................................. 2-276292

[51] Int. Cl.$^5$ .......................... G06F 15/21; G06F 9/44
[52] U.S. Cl. ........................................ 395/61; 395/76; 395/900; 395/926
[58] Field of Search ................... 395/61, 925, 900, 75, 395/77, 76, 61

[56] References Cited

U.S. PATENT DOCUMENTS 4,837,725  6/1989  Yamakawa ......................... 364/807
4,970,657  11/1990  Wolf .................................... 364/513
5,189,728  2/1993  Yamakawa et al. ................. 395/51

FOREIGN PATENT DOCUMENTS 0233071   8/1987   European Pat. Off. .
2-272638  11/1990  Japan .
2-273802  11/1990  Japan .
2-294832  12/1990  Japan .
3-025532   2/1991  Japan .
3-071303   3/1991  Japan .
2211324    6/1989  United Kingdom .

OTHER PUBLICATIONS

Karr et al., "Improved Fuzzy Process Control of Spacecraft Autonomous Rendezvous using a Genetic Algorithm", SPIE vol. 1196 Intelligent Control & Adaptive Systems, Nov. 1989, 274-288.

Giles, R., "The Concept of Grade of Membership", Fuzzy Sets and Systems, 25, 1988, pp. 297-323.

Product Showcase, "TIL Announces TIL Shell", AI Expert, Jun. 1990, 68.

"Expert Shell for Control of Plant (ERIC)", Automation, vol. 33, No. 6, Jun. 1988, Article 2, pp. 17-21.

Bunji Kaneko, et al., "Expert System for Investment Based on Fuzzy Reasoning", Journal of Information Processing Society of Japan, Aug. 1989, Article 3, pp. 963-969.

Tunekazu Endo, et al., "Fuzzy Expert System Building Shell", Journal of Information Processing Society of Japan, Aug. 1989, Article 4, pp. 948-956.

*Primary Examiner*—Michael R. Fleming
*Assistant Examiner*—Robert W. Downs
*Attorney, Agent, or Firm*—Fay, Sharpe, Beall, Fagan, Minnich & McKee

[57] ABSTRACT

A fuzzy evaluation and modification system evaluates and modifies the fuzzy knowledge in a fuzzy reasoning system. The fuzzy knowledge includes fuzzy rules, each described in an "if . . . , then . . ." format, and membership functions defining meanings of propositions described in the "if . . . , then" parts. Results of the fuzzy reasoning are monitored and compared with real data of a plurality of real test cases to evaluate the fuzzy knowledge. An influence power of each of the fuzzy rules with respect to the fuzzy reasoning results is attained for all the cases. Superpositional display of real data on the membership functions of the "if . . ." part and reasoning results on the membership functions of the "then . . ." part indicates a relationship between the membership function and the real data. The system includes units for obtaining a grade of rule representing adequacy of the fuzzy rule based on the membership functions associated with the "if" part, attaining defuzzification values of the membership functions related to the "then" part and obtaining differences between the defuzzification values and the real data. A relationship between the grade of rule and the difference thus obtained between the defuzzification values and the real data is outputted to an output unit. The fuzzy knowledge is modified by an operator in association with the output.

20 Claims, 28 Drawing Sheets

FIG. 3

| | STOCK PRICE | RATIO OF RETURN | RATIO OF DEVIATION FROM THE MOVING AVERAGE |
|---|---|---|---|
| 1 | 743 | 0.08 | −4.73 |
| 2 | 796 | −2.68 | 3.48 |
| N | 700 | −7.93 | 0.01 |

WORKING MEMORY

41

| RESULT |
|---|
| 738 |
| 780 |
| 715 |

42

| | RULE NO | RATIO OF RETURN | RATIO OF DEVIATION FROM THE MOVING AVERAGE |
|---|---|---|---|
| ·····1····· | 1 | 0.3 | 0.8 |
| | 2 | 0.2 | 0.2 |
| ·····2····· | 1 | 0.4 | 0.3 |
| | 2 | 0.1 | 0.6 |
| ·····N····· | 1 | 1.0 | 0.5 |
| | 2 | 0.0 | 0.5 |

43

| COUNTER | 0 | 1 | 2 | | 3 | 0 | 0 |
|---|---|---|---|---|---|---|---|
| | 1 | 2 | 3 | | BUN-2 | BUN-1 | BUN |

FIG. 10

| RULE NO. \ ORDER | 1 | 2 | ~ | NUMBER OF RULES |
|---|---|---|---|---|
| 1 | 0 | 1 | ~ | 0 |
| 2 | 4 | 2 | ~ | 0 |
| ~ | ~ | ~ | ~ | ~ |
| NUMBER OF RULES | 0 | 0 | ~ | 3 |

| NO \ ORDER | 1 | 2 | 3 | 4 | 5 | 6 |
|---|---|---|---|---|---|---|
| 1 | 0 | 1 | 3 | 1 | 1 | 0 |
| 2 | 4 | 2 | 0 | 0 | 0 | 0 |
| 3 | 2 | 3 | 0 | 1 | 0 | 0 |
| 4 | 0 | 0 | 2 | 2 | 1 | 1 |
| 5 | 0 | 0 | 1 | 1 | 2 | 2 |
| 6 | 0 | 0 | 0 | 1 | 2 | 3 |

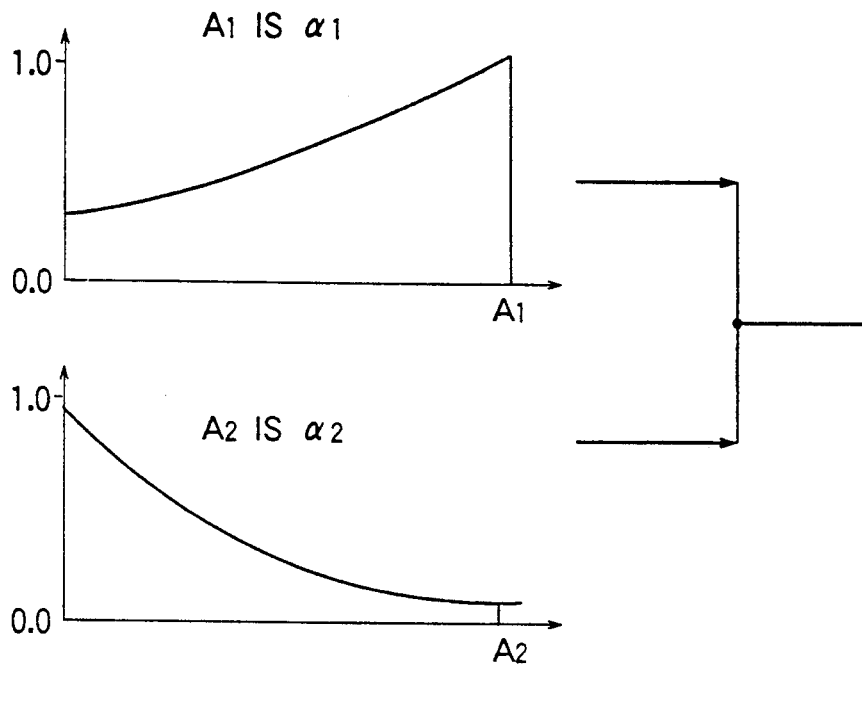
FIG. 15A
FIG. 15B
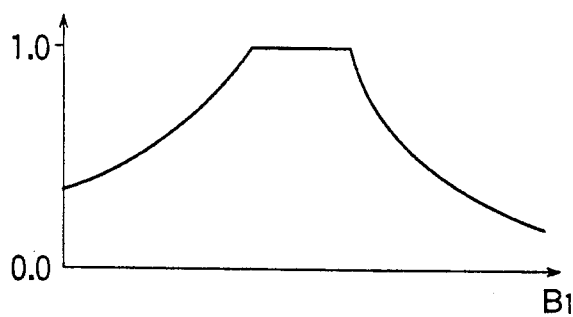
FIG. 15C

FIG. 21

| NO | FUZZY RULE | EFFECTIVE GRADE 1904 | AVAILA-BILITY FLAG |
|---|---|---|---|
| | (2101) (2102) | (2103) | (2104) |
| 1 | IF{(A₁is α1)∧(A₂is α2)···}THEN(B₁isβ1) | R1 | |
| | | | |
| | | | |
| | | | |
| | | | |
| | | | |
| | | | |

```
        CONDITION SETTING SCREEN
TIME SERIES DATA

WEIGHT       INTERVAL
    [ K1 ]     [  D1  ] ~ [  D2  ]
    [ K2 ]     [  D3  ] ~ [  D4  ]
    [ K3 ]     [  D5  ] ~ [  D6  ]

CONDITIONS FOR CREATING
DISTRIBUTION SITUATION LIST

MINIMUM THRESHOLD
           OF GRADE [  ε  ]
```

| NO | CONTENTS OF FUZZY RULE | AVAILA-BILITY | $P_\ell$ | $L_\ell$ | EFFECTIVE GRADE | AVAILA-BILITY FLAG |
|---|---|---|---|---|---|---|
| 3 | IF {(A1 is α1)∧···} THEN (B1 is B1) | 1.0 | 3.5 | 2.0 | 0.5 | |
| 5 | | | | | | |
| | | | | | | |
| | | | | | | |
| | | | | | | |

⎨———— A ————⎬⎨———— B ————⎬

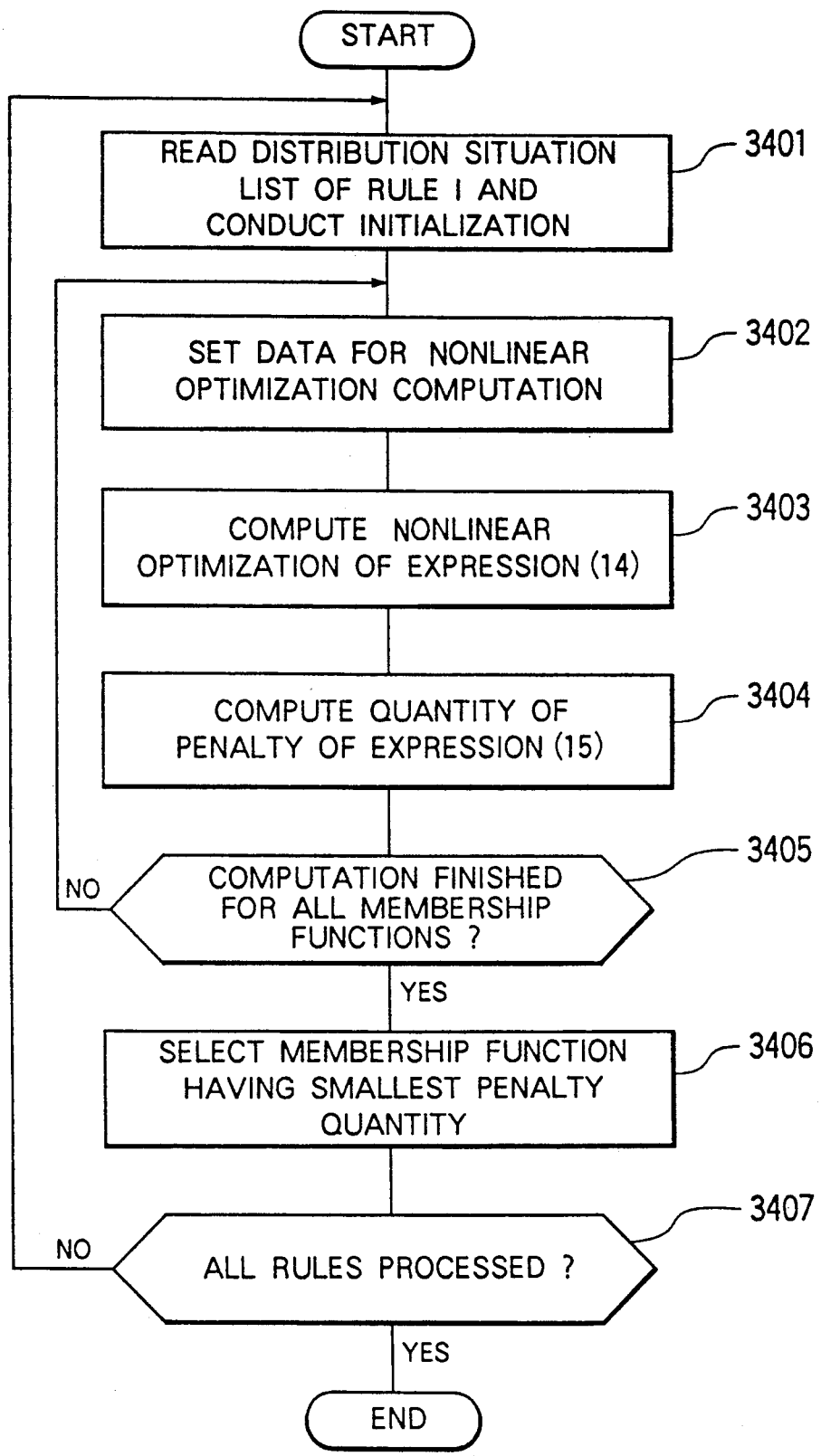

METHOD AND SYSTEM FOR EVALUATING AND MODIFYING FUZZY KNOWLEDGE

BACKGROUND OF THE INVENTION

1. Field of the Invention

The present invention relates to an expert system in which experiences and know-how of humans are reasoned or inferred by use of knowledge (a knowledge base) to solve a problem. Particularly, the present invention relates to a method of and a system for evaluating knowledge suitably applicable to a case where the knowledge is represented as a fuzzy knowledge for fuzzy inference or reasoning. Moreover, the present invention relates to a method of and a system for modifying or updating fuzzy knowledge based on an evaluation result as well as to a decision support system adopting a fuzzy knowledge which can be evaluated and modified.

2. Description of the Prior Art

Systems developed by applying fuzzy reasoning thereto have been described in articles such as "Fuzzy Control Method and Application of the Same to Real System", Transaction of the Institute of Electrical Engineers of Japan, Vol. 109-C, No. 5, pp. 330-336, May 1989 (Article 1); "Expert Shell for Control of Plant (ERIC)", Automation, Vol. 33, No. 6, pp. 17-21, June 1988 (Article 2); "Expert System for Investment based on Fuzzy Reasoning", Journal of Information Processing Society of Japan, pp. 963-969, Aug. 1989 (Article 3); and "Fuzzy Expert System Building Shell", Journal of Information Processing Society of Japan, pp. 948-956, August 1989 (Article 4).

In accordance with a system described in Article 1, know-how of experts and/or specialists is collected as fuzzy rules or knowledge rules in a knowledge rule base such that depending on a state of a reasoning object, a reasoning operation is conducted by use of contents of the knowledge rule base. In an automatic train operation system described in Article 1, characteristics of an object (a train) of reasoning are kept unchanged. Consequently, once the know-how of experts (drivers) is gathered as rules in a knowledge rule base, the system is operated for a long period of time with the knowledge rule base.

Article 2 also describes a fuzzy rule representation and a fuzzy inference mechanism. In addition, fuzzy variables have been described. More specifically, it has been notified that when setting fuzzy variables, a trial-and-error procedure is required to be repeatedly achieved to adjust membership functions of fuzzy variables, thereby attaining the membership functions appropriately adaptive to the situation. Moreover, there has been described that fuzzy variables can be additionally set when necessary.

Article 3 describes a method of registering and of modifying rules, which is devised on recognition that even when a rule leads to a satisfactory result with respect to data in the past, it is not guaranteed that the rule is also efficient in the future. In this method, data attained in a fixed period of time in the past are processed to obtain parameter values such that based on the resultant parameter values, the rule registration and modification are accomplished. However, only a variable can be set as an object of the learning; furthermore, the variable is required to be contained in an if clause of a statement of if - - -, then - - -.

Article 4 describes a method of generating and of evaluating fuzzy control rules through a simulation. In this method, more specifically, by checking such items displayed by a graph representation function as input and output values at respective points of time in a simulation and membership functions associated with output values resultant from a fuzzy reasoning, the user can confirm effectiveness of fuzzy control rules for modifications thereof.

SUMMARY OF THE INVENTION

It is therefore an object of the present invention to provide a method of and a system for facilitating evaluation of adequacy of fuzzy knowledge adopted for a reasoning operation.

Another object of the present invention is to provide a method of and a system for adjusting membership functions of fuzzy knowledge based on results from evaluation on the adequacy of fuzzy knowledge used for a reasoning operation.

Still another object of the present invention is to provide a method of and a system for obsoleting, when contents of knowledge are deteriorated with a lapse of time for a reasoning object, the pertinent knowledge which is already inadequate for the reasoning operation. Particularly, the object of the present invention is to provide a method and a system suitably applicable to a decision support system in which contents of knowledge are deteriorated with a lapse of time.

The objects above are set by the inventors in consideration of the following problems of the prior art above.

The change of the fuzzy knowledge associated with a reasoning object with a lapse of time is taken into consideration only in Article 3. Necessity of evaluation and modification of the fuzzy knowledge, although in a state constructing the fuzzy knowledge, is recognized in Articles 2 and 4. In particular, Article 4 describes the evaluation and adjustment of the fuzzy knowledge through a simulation.

First, in a case where the fuzzy knowledge varies with a lapse of time, the evaluation and adjustment of the fuzzy knowledge are to be conducted entirely by humans. Namely, the persons in charge of operations above are required to possess experiences and know-how at a level of experts. In some cases, although impossible, experiences and know-how at a level exceeding those of experienced persons are necessitated. This is because the person is required to be versed in the mechanism of the reasoning to be achieved depending on the fuzzy knowledge. This leads to a need for a method of and a system for facilitating the evaluation and adjustment of the fuzzy knowledge.

The fuzzy knowledge evaluation and adjustment conducted through a simulation of Article 4 will be efficient in a case of a fuzzy reasoning applied to a field of a plant control as shown in Article 4 for the following reason. That is, in the plant control, a control object, namely, a reasoning object is represented by a mathematical expression model such that although state variables may vary, the fuzzy knowledge employed for the fuzzy reasoning is not changed with a lapse of time. As a result, there can be utilized a simulator in which the model is incorporated. Conversely, that the fuzzy knowledge varies with a lapse of time means that the model also changes therewith. Namely, the change in the model need only be replaced with the variation of the fuzzy knowledge, which has not been described in Article 4.

A typical example of the fuzzy knowledge variation with respect to time is found in a case where the fuzzy reasoning is applied to a business field. In addition to a difficulty in configuring an appropriate modeling of an object in the business field, the fuzzy knowledge need be varied with changes in environmental states when the fuzzy inference is applied to this field. In other words, since adequacy of the fuzzy knowledge is deteriorated with a change in environmental states, the variation of the knowledge adequacy is required to be evaluated so as to adjust the knowledge to be consistent with the changed environmental states.

Based on the recognition of the problems of the conventional technologies, the objects of the present invention have been established. In this regard, it is to be understood from the description above that the problem recognition itself is not implied by the prior arts.

In order to achieve the objects above, the method and the system of the present invention are characterized as follows.

In a fuzzy reasoning system as an object, a fuzzy reasoning or inference is conducted depending on fuzzy knowledge including fuzzy rules each described in a form of if - - -, then - - - and membership functions defining meanings of respective propositions described in the if and then clauses of the fuzzy rules. In accordance with the method and the system of the present invention, the fuzzy knowledge of the fuzzy reasoning system is evaluated such that the fuzzy knowledge is modified depending on a result of the evaluation, which is specifically achieved as follows. Namely, a result attained by executing a fuzzy inference using fuzzy rules is compared with real data to produce a result of the comparison.

In a favorable mode of carrying out the invention, the comparison result may be represented as a difference between the reasoning result and the real data. The difference is represented in a histogram. Moreover, in another mode, based on a membership function related to an if part, there may be attained a grade of rule designating adequacy of a fuzzy rule so as to compute a defuzzification value for a membership function associated with a then part to obtain a difference between the defuzzification value and the real value. As a result, there are produced relationships between grades of rule and the comparison results (differences between the defuzzification values and real data). Furthermore, since a grade of rule represents an influence power of a fuzzy rule, the fuzzy rules may be assigned with values of order in a sequence of the influence power to establish correspondences between the respective fuzzy rules and the assigned values of order.

In addition, as a variation of the present invention, the objects above may be achieved as follows.

Applying actual time series data to an object field of a fuzzy reasoning, based on a value of a membership function of an if part, an adaptation grade representing goodness of fit related to the if part and a situation value of a then part are obtained to produce a distribution of state representing a plurality of sets each including a combination of the grade and the situation value. Using the distribution of state thus created and a membership function of the then part, a grade of rule is determined as valid or inappropriate for the fuzzy rule, thereby displaying the grade. In a mode of carrying out the invention, an average distance between the membership function of the then part and the distribution of situation may be used as a grade of inappropriateness. Moreover, the validity or effective grade may be displayed as a valid reference or effective grade such that the user specifies a new validness or effective grade for the fuzzy rule. In addition, whether a fuzzy rule is to be used or not is desirably determined depending on a state of utilization or non-utilization beforehand memorized. Furthermore, time series data may be subdivided into groups associated with a predetermiend period of time to respectively assign weights to the groups so as to produce a distribution of state based on the weights thus assigned to the groups.

Incidentally, in the present specification and accompanying drawings, the terms are used according to the definitions below.

Adaptation or conformity grade: A value of a membership function to be represented with a value from 0 to 1.

Effective grade: A grade of conviction (reliability) of a grade of a fuzzy rule to represent an application ratio (weight) of an adaptation grade.

Grade of rule: Represents adequacy of a fuzzy rule to be expressed with the minimum value selected from a plurality of grades attained for the fuzzy rule.

According to the present invention, particularly, the results of reasoning, the intermediate results thereof, and the like are converted into output products including a distribution of errors, a distribution of state, etc. In consequence, adequacy of the fuzzy knowledge used in a reasoning operation can be easily evaluated. In this case, even when a fuzzy inference is to be conducted on time series data, the products are displayed in a form not including time elements of the time series data, which hence helps the user understand the contents of the output products. As described in Article 3 above, if the time series data and the reasoning results are outputted only for comparison therebetween along a time axis, even when the user recognizes that the fuzzy knowledge is inadequate, an inappropriate point cannot be concretely identified. In this connection, according to the present invention, the evaluation results thus displayed do not include the time elements which prevents the user from easily understanding the content thereof, thereby consequently facilitating the evaluation of adequacy of the fuzzy knowledge. Moreover, based on the results of an adequacy evaluation conducted on the fuzzy knowledge for a reasoning operation, membership functions related to the fuzzy knowledge can be easily adjusted. In addition, when handling a reasoning object for which contents of the knowledge vary with a lapse of time, such a knowledge of which adequacy is already lost can be obsoleted not to be employed thereafter for a reasoning operation. Particularly, according to the present invention, there can be implemented a method and a system suitable for a decision support system in which the contents of the knowledge change with a lapse of time.

BRIEF DESCRIPTION OF THE DRAWINGS

The objects and features of the invention will best be understood from a detailed description of a preferred embodiment thereof, selected for purposes of illustration and shown in the accompanying drawings, in which:

FIG. 3 is a diagram showing a table structure of a data storing area;

FIG. 4 is a schematic diagram showing a table structure in a working memory;

FIG. 10 is a diagram showing the table constitution of a counter employed to create a distribution of orders;

FIG. 11 is a diagram showing a screen display representing the contents of the counter of FIG. 10 employed to create a distribution of orders;

FIGS. 15A to 15C are graphs showing examples of membership functions related to fuzzy rules;

FIG. 21 is a diagram showing the construction of a fuzzy rule base;

FIG. 34 is a flowchart showing the operation to determine a membership function;

DESCRIPTION OF THE PREFERRED EMBODIMENTS

Figure 1:
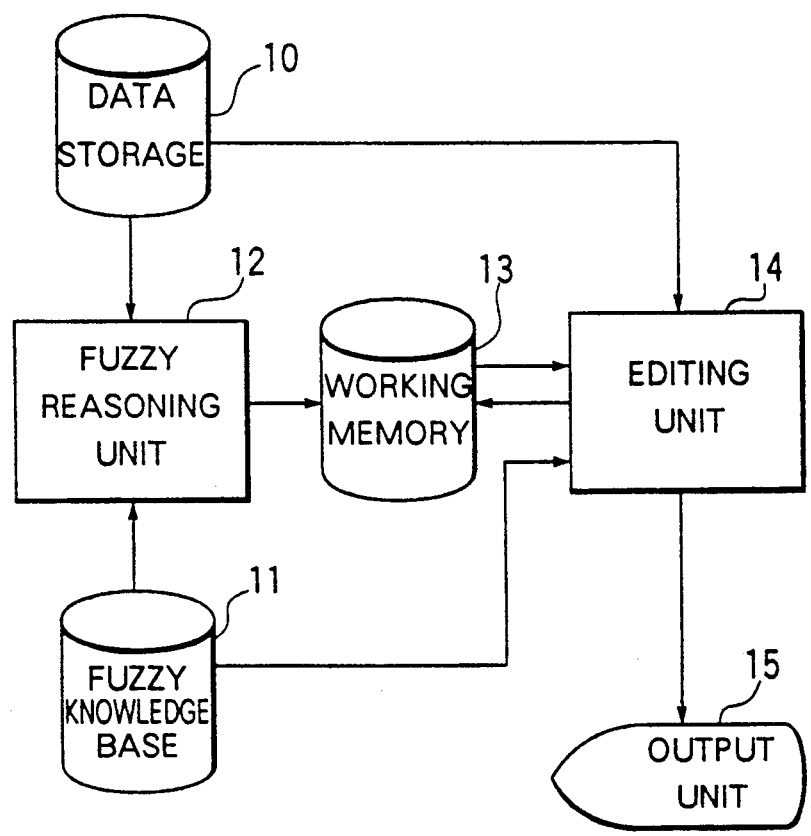
FIG. 1 is an overall system diagram of an embodiment of a fuzzy evaluation system according to the present invention.

Referring now to the drawings, a description will be given of an embodiment according to the present invention.

FIG. 1 shows the constitution of an embodiment of a fuzzy rule evaluation system in accordance with the present invention. The configuration includes a data storage 10 for storing therein time series data such as stock prices, a fuzzy knowledge base 11 for storing therein membership functions and fuzzy rules, a fuzzy reasoning or inference unit 12 for achieving a fuzzy reasoning operation on data of the data storage 10 according to the fuzzy knowledge base, a working memory 13 to be loaded with data such as intermediate and final results attained through the fuzzy reasoning by the fuzzy inference unit 12, an editing or editor unit 14 for combining and/or converting information of the data storage 10, the fuzzy knowledge base 11, and the working memory 13, and an output unit 15 such as a cathode-ray tube (CRT) for displaying results attained from the execution of the editing unit 14. The structure of this embodiment is a system in which a change of a stock price is estimated depending on a ratio of return of the stock and a ratio of deviation from the moving average of the stock price.

It is assumed here that the fuzzy knowledge base 11 is loaded with fuzzy rules:

Rule 1:
   if (ratio of return is low and ratio of deviation from the moving average is negative)
   then (stock price increase)

Rule 2:
   if (ratio of return is high and ratio of deviation from the moving average is positive)
   then (stock price increase)

and membership functions defining propositions of if and then parts of the fuzzy rules, respectively. A proposition here denotes an entry item enclosed in the parentheses of the if or then part above.

FIG. 3 shows the configuration of a table disposed in the data storage 10. The table is loaded with N data entries each including a set of data items of a case in the past, namely, a stock price, a ratio of return, and a ratio of deviation from the moving average.

FIG. 4 shows a table structure formed in the working memory 13, which comprises a result area 41, an intermediate result area 42, and a counter 43. The result area 41 is adapted to store therein inference results of N cases which are attained by executing a fuzzy reasoning on data of the N cases loaded in the data storage 10. The intermediate result area 42 is disposed to store therein results attained as grades of rules associated with the if part of each fuzzy rule with respect to the ratio of return and the ratio of deviation from the moving average for each case. For example, in FIG. 4, for the proposition "ratio of return is low" of the first fuzzy rule (rule No. 1), the grade of rule is represented as 0.3. The counter 43 includes areas C(0), C(1), ..., C(BUN), where the number of areas is designated by BUN. A k-th areas (k=1, BUN) is loaded with a count value ((k=1, BUN) means that k ranges from 1 to BUN). This value denotes the number of appearances of an event in which an error E belongs to a zone $$\left[ Emin + \frac{Emax - Emin}{BUN} \cdot (k-1), Emin + \frac{Emax - Emin}{BUN} \cdot k \right]$$

attained by dividing an error definition range [Emin, Emax] by the value of BUN. For example, as a result of an execution of a fuzzy reasoning for the N cases, the counter (2) indicates one, which denotes the number of events in which the error E belongs to a zone $$\left[ Emin + \frac{Emax - Emin}{BUN}, Emin + \frac{Emax - Emin}{BUN} \times 2 \right]$$

Figure 5:
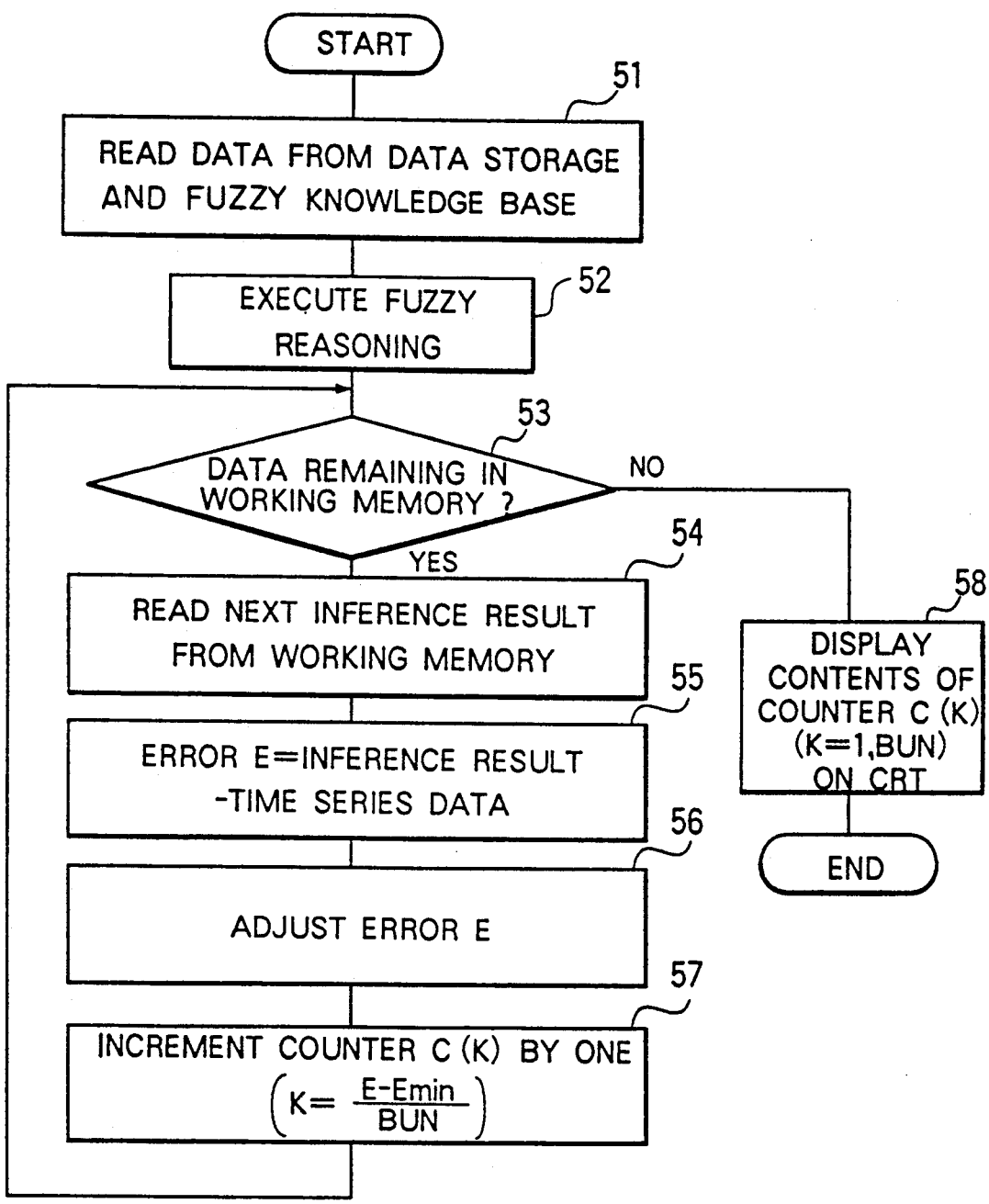
FIG. 5 is a flowchart showing the processing procedure of the fuzzy evaluation system according to the present invention.

FIG. 5 is a flowchart showing the processing procedure of the fuzzy evaluation system according to the present invention.

In this flowchart, a step 51 first reads data from the data storage 10 and the fuzzy knowledge base 11. Next, for each case above, the fuzzy reasoning unit 12 sequentially executes a fuzzy reasoning on the ratio of return and the ratio of deviation from the moving average based on the fuzzy knowledge base 11 to store intermediate and final results in the working memory 13 (step 52).

The editor unit 14 checks to determine whether or not the result area 41 of the working memory 13 contains any data to be processed (step 53). If this is the case, the next inference result is read from the result area 41 (step 54). The editor unit 14 then computes a difference between the inference result and time series data to obtain an error E (step 55). For example, in the first case, the inference result of the result area 41 is 738 and the stock price (time series data) of the data storage 10 is 743. Consequently, the error E is determined as 738 − 743 = −5. Subsequently, if the error E determined in the step 55 is beyond the error definition range [Emin, Emax], the error E is modified or adjusted to be within the range. Specifically, if E > Emax, the error E is set to Emax; whereas, if E < Emin, the error E is set as Emin (step 56). In this regard, the width of the error definition range is ordinarily set a sufficiently large value in advance such that the errors appear at positions within the range.

Next, in order to determine to which one of the obtained intervals $$\left[ Emin + \frac{Emax - Emin}{BUN} \times (k-1), Emin + \frac{Emax - Emin}{BUN} \cdot k \right]$$

the error E attained through the steps 55 and 56 belongs, the system computes $$K = \frac{E - Emin}{BUN}$$

and then increments the content of the counter C (K) by one (step 57), thereby transferring control to the step 53.

Figure 6:
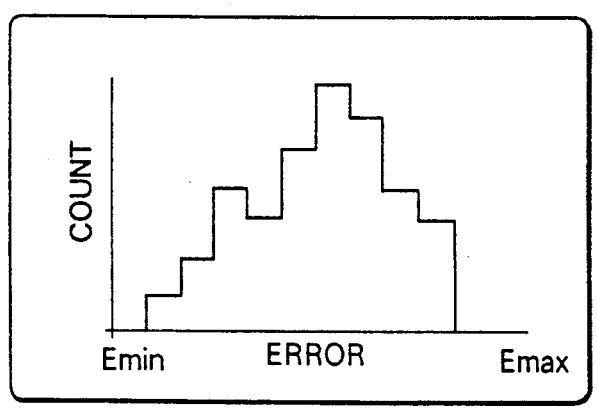
FIG. 6 is a graph showing an example of a distribution of errors.

In the step 53, when it is found that the contents of the result area 41 of the working memory 13 are already used up, the contents of the counter C (k) (k=1, BUN) are represented in the form of a histogram as shown in FIG. 6 (step 58), thereby terminating the processing. In this connection, the error definition range is favorably determined such that the central value thereof indicates the error E=0.

According to the embodiment, although the time series data is reprocessed, and the displayed data does not contain time elements, the user can easily understand a degree of correctness of the inference or reasoning result. In a case where the result is incorrect, a degree of the incorrectness can be clearly recognized. Particularly, the user can attain a quantity of shift of the inference result and a tendency thereof with respect to the real data (time series data).

Figure 7:
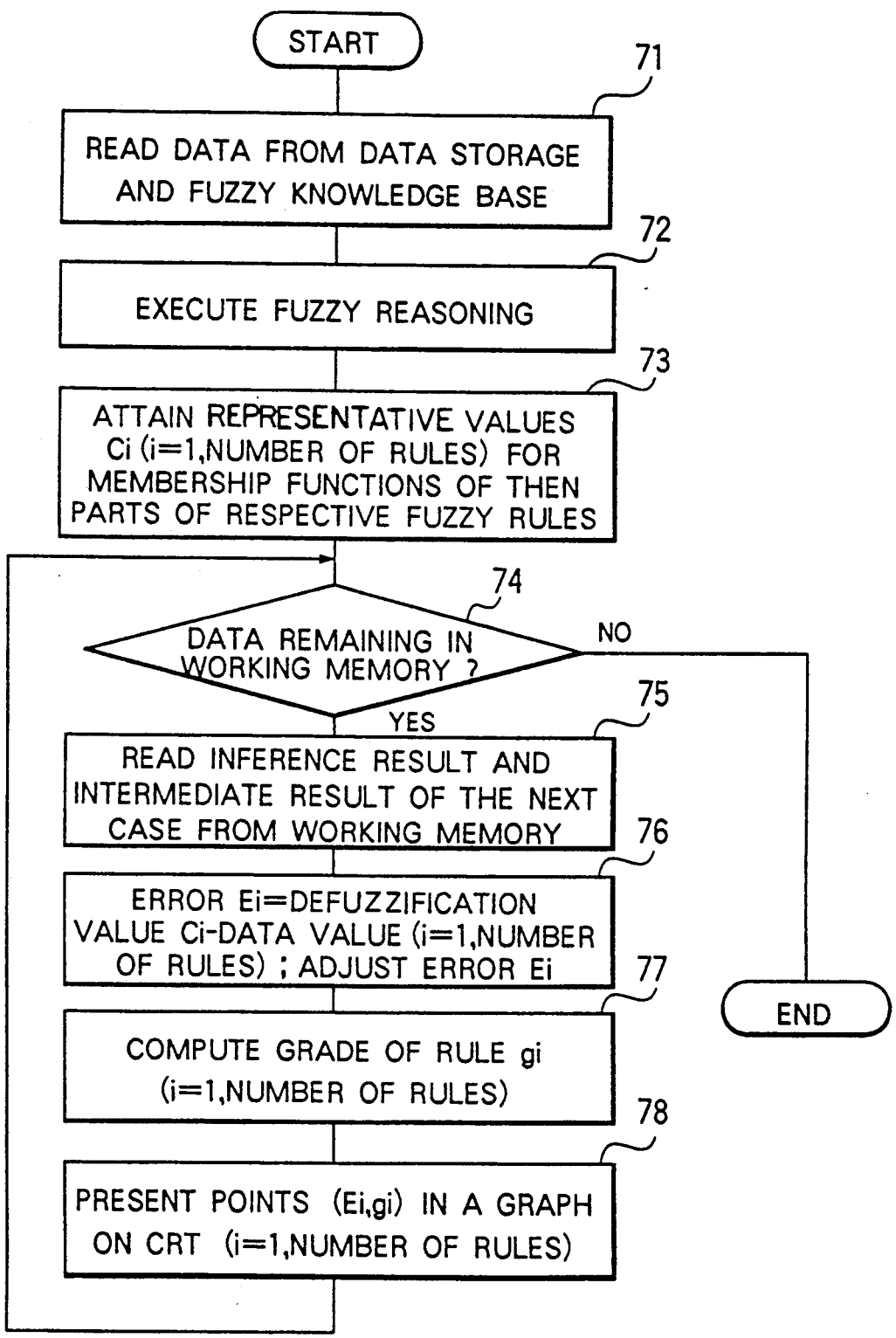
FIG. 7 is a flowchart showing the processing procedure of another example of the fuzzy evaluation system according to the present invention.

FIG. 7 is a flowchart showing another processing procedure of the fuzzy evaluation system according to the present invention.

In this procedure, a step 71 first reads data from the data storage 10 and the fuzzy knowledge base 11. Next, for each case above, the fuzzy reasoning unit 12 sequentially executes a fuzzy reasoning on the ratio of return and the ratio of deviation from the moving average by use of the fuzzy knowledge base 11 to store intermediate and final results in the working memory 13 (step 72).

In order to attain representative values Ci (i=1, number of rules) of membership functions respectively contained in the then parts of the respective fuzzy rules, the editor unit 14 computes expression (1) as follows (step 73).

$$C = \frac{\sum_{i=1}^{n} i \cdot f(xi)}{\sum_{i=1}^{n} f(xi)} \quad (1)$$

where, f(xi) representatively denotes a membership function obtained by combining the membership functions of the respective then parts of the rules (rule i).

Thereafter, a check is made to determine whether or not the result area 41 and the intermediate result area 42 of the working memory 13 contain any data to be processed (step 74). If the data is found, for the next case, the system accesses the working memory 13 to read an inference result from the result area 41 and a grade assigned to a proposition of an if part from the intermediate result area 42 (step 75). A stock price (time series data) related to the inference result obtained in the step 75 is then subtracted from the representative value Ci attained in the step 73 to determine an error Ei, thereby computing the representative values Ci (i=1, number of rules) for the respective fuzzy rules (step 76).

For each fuzzy rule, the system computes grades of rule gi (i=1, number of rules) for a case associated with the reasoning result obtained in the step 75 (step 77).

A description will now be given of a fuzzy reasoning or inference method by referring to FIG. 2.

FIG. 2 shows a fuzzy reasoning method which has been generally adopted and which employs an Max-Min method. In the fuzzy inference method of FIG. 2, a reasoning operation is carried out based on two fuzzy rules (rules 1 and 2):

Rule 1:
if (temperature is low and pressure is low)
then (fuel is increased)

Figures 2A, 2B, 2C:
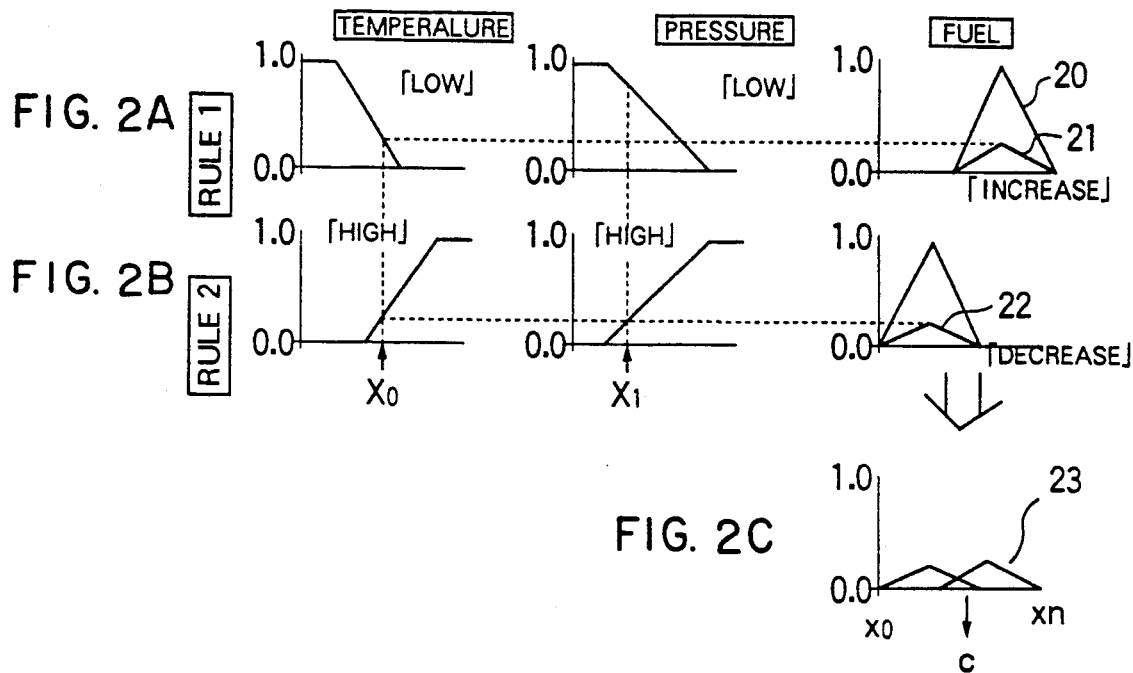
FIGS. 2A to 2C are diagrams for explaining a fuzzy reasoning method.

Rule 2:
if (temperature is high and pressure is high)
then (fuel is decreased)

and membership functions (presented in graphs of FIGS. 2A to 2C) defining meanings of respective propositions. First, the grade associated with goodness of fit is attained for the proposition of each if part. Thereafter, for each fuzzy rule, from the grades assigned to the if parts, a grade having the minimum value is selected as a grade of rule. A description will next be given of a fact that the greater is the value of the grade of rule, the stronger is the influence imposed on an operation to attain the reasoning result. For example, under conditions of the temperature and pressure respectively set to $x_0$ and $x_1$, the grades associated with the propositions "temperature is low" and "pressure is low" of the fuzzy rule 1 (FIG. 2A) are 0.3 and 0.8, respectively. Consequently, the grade of rule is attained as 0.3 for the fuzzy rule 1. Similarly, the grade of rule is determined as 0.2 for the fuzzy rule 2 (FIG. 2B). Next, multiplying the grades of rule thus attained respectively by membership functions of then parts of the associated fuzzy rules modifies the membership functions of the then parts. For example, the system multiplies a membership function 20 of the proposition "fuel is increased" of the fuzzy rule 1 by the grade of rule =0.3 to attain a membership function 21. Similarly, for the proposition "fuel is decreased" of the fuzzy rule 2, a new membership function 22 is developed. Thereafter, combining the membership functions of the then parts of the respective fuzzy rules, a computation is conducted thereon to determine a barycenter, thereby obtaining a value c (FIG. 2C) as a reasoning result. More specifically, assuming that the resultant function is denoted as f(x) and the definition range of the function f(x) is [$X_1, X_n$], the result c is obtained from an expression $$c = \frac{\sum_{i=1}^{n} i \cdot f(xi)}{\sum_{i=1}^{n} f(xi)}. \quad (1)$$

Moreover the membership functions 21 and 22 of the then parts are combined with each other to develop a function 23.

Fuzzy knowledge is constructed through the following procedure. First, states or situations to be evaluated (evaluation indices) are extracted and then know how items associated therewith are described in the form of membership functions and fuzzy rules to form a fuzzy knowledge base. Subsequently, the user selects a case which is considered to be subjected to a fuzzy reasoning operation. Using a fuzzy knowledge base produced for the case, a fuzzy inference is conducted on the case. Based on a result of the reasoning operation, a check is made to determine whether or not the fuzzy knowledge is appropriate for the case. If this is not the case, the fuzzy knowledge is modified or changed to execute the fuzzy inference again. When an appropriate result is attained from the influence, the similar operation is achieved for another case. As above, the fuzzy influence is conducted for all possible cases by modifying the contents of the fuzzy knowledge base until acceptable results are obtained for the respective cases.

Returning now to FIG. 7, in a case where the Max-Min procedure is adopted to achieve the inference or reasoning as shown in FIGS. 2A to 2C, from the grades representing goodness of fit of one or more if part propositions, a grade having the minimum value is set as a grade of rule gi. For example, in the step 75, when intermediate reasoning results of the first case contain values 0.3 and 0.8 for grades of the if part proposition of the first fuzzy rule (FIG. 4), the grade of rule gi is determined in this case as min (0.3, 0.8)=0.3.

On the CRT 15, the values respectively of the errors Ei computed in the step 76 and the grades of rule gi determined in the step 77 are plotted as dots in a graph in which each point (x, y) is represented with a combination (e, gi) of an error Ei and a grade of rule gi associated therewith (i=1, number of rules). In this connection, it is assumed that symbols and colors of points to be displayed vary depending on rule numbers (step 78).

In the step 74, when data to be processed is missing in the working memory 13, the processing is terminated.

Figure 8:
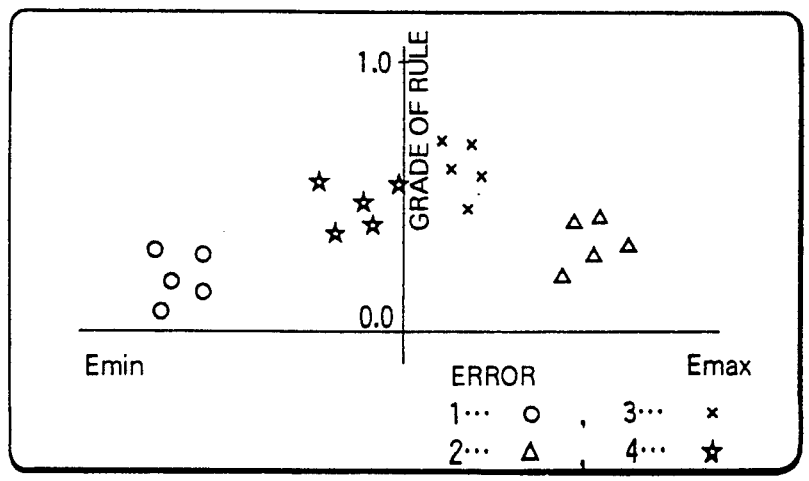
FIG. 8 is a diagram showing an example of a screen display presenting relationships between errors and grades of rule.

FIG. 8 is an example of a screen image produced in this embodiment. In this graph, the ordinate and abscissa stand for errors and grades of rule, respectively. This screen image shows intermediate results of fuzzy reasoning operations conducted for five cases based on four fuzzy rules. The respective intermediate results are denoted with different marks or symbols depending on rule numbers.

According to the embodiment, for each fuzzy rule, relationships between grades of rule and errors are displayed. In consequence, the user can easily understand inappropriate fuzzy rules, which include here (1) a fuzzy rule having a large grade of rule and a great error and (2) a fuzzy rule having a small grade of rule and a small error. Also in this embodiment, although time series data are used as objects to be processed, the displayed data does not contain time elements, which hence helps user easily recognize adequacy or appropriateness of each fuzzy rule.

Figure 9:
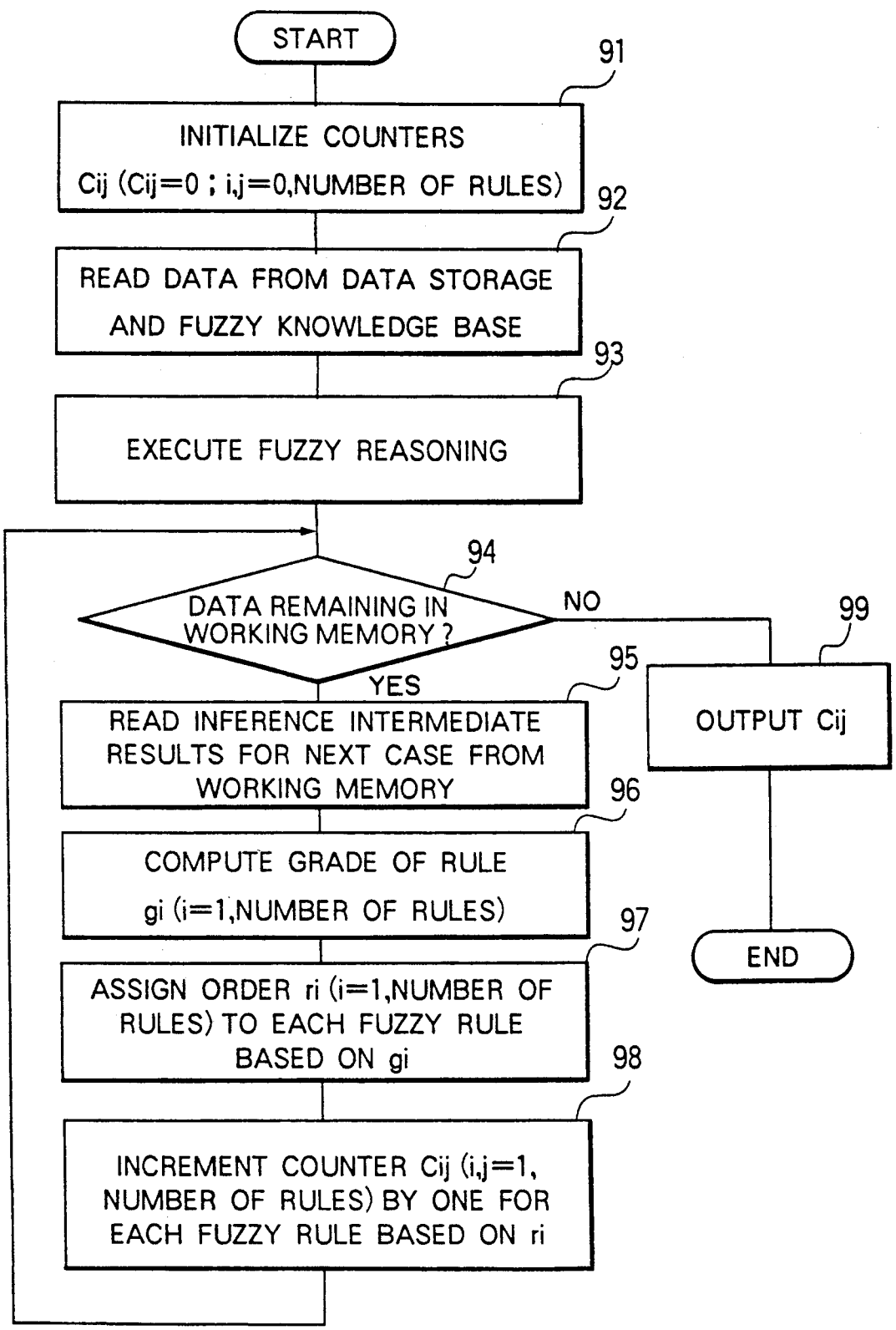
FIG. 9 is a flowchart showing the processing procedure of another example, according to the present invention.

FIG. 9 is a flowchart showing another processing procedure employed in the fuzzy evaluation system according to the present invention.

FIG. 10 shows a variation example of the table structure of the counter 43 formed in the working memory 13. The counter 43 including fields Cij of FIG. 10 is constituted with a two-dimensional area in which the number of fields is denoted by (number of rules) x (number of rules). The counter Cij is used to store therein a count (frequency) representing the number of occurrences of an event in which an i-th fuzzy rule (ordinate) is assigned with an order (abscissa) indicated by j.

FIG. 11 shows an example of a screen display on the CRT 15 representing the contents of the associated counters Cij. In this output example, the number of fuzzy rules is six and there is presented for example, that an event or a case in which the second fuzzy rule (No. 2) is assigned with an order of 1 appears four times.

Next, with reference to FIG. 9, the operation of the embodiment will be described.

First, a value of 0 is set to the counter Cij (i, j=1, number of rules) for an initialization of the counter Cij (step 91). Next, a step 92 reads data from the data storage 10 and the fuzzy knowledge base 11. For the ratio of return and a ratio of deviation from the moving average of each case attained from the data storage 10, the fuzzy reasoning unit 12 sequentially conducts a fuzzy inference depending on the contents of the fuzzy knowledge base 11. Intermediate results and final results of the reasoning operations are then loaded in the working memory 13 (step 93).

The editor unit 14 checks to determine whether or not data to be processed are remaining in the intermediate result area 42 of the working memory 13 (step 94). If data are found, for the next case, an adaptation grade assigned to a proposition of an if part is read from the intermediate result area 42 of the working memory 13 (step 95). For each fuzzy rule, a grade of rule gi (i=1, number of rules) is computed in the same manner as for the step 77 (step 96).

Next, depending on the grades of rule gi determined for the respective fuzzy rules, the system assigns values of order to the fuzzy rules in a descending sequence of the grades of rule. In this regard, it is assumed that the i-th fuzzy rule is assigned with an order of ri (i=1, number of rules; step 97). For example, in the first case attained from the intermediate result area 42 of FIG. 4, since the first and second fuzzy rules are respectively assigned with values 0.3 and 0.2 as grades of rule, the orders $r_1$ and $r_2$ respectively of the first and second rules are obtained as 1 and 2, respectively.

Thereafter, based on the order ri of the i-th fuzzy rule (i=1, number of rules), the content of the related counter Cij is incremented by one (step 98). For example, in the first case obtained from the intermediate result area of FIG. 4, since the first and second fuzzy rules are respectively assigned with orders $r_1=1$ and $r_2=2$, the contents of counters $C_{11}$ and $C_{22}$ are respectively incremented by one.

In the step 94, if data to be processed is missing in the intermediate result area 42 of the working memory 13, the contents of the counters Cij (i, j=1, number of rules) are displayed on the CRT 15 (step 99), thereby terminating the processing. FIG. 11 shows an example of the CRT display in the step 99.

According to the embodiment, there are presented effectiveness of the fuzzy rules on the CRT 15, the user can correctly recognize fuzzy rules which are too strong or too weak in the fuzzy reasoning operation.

Figure 12:
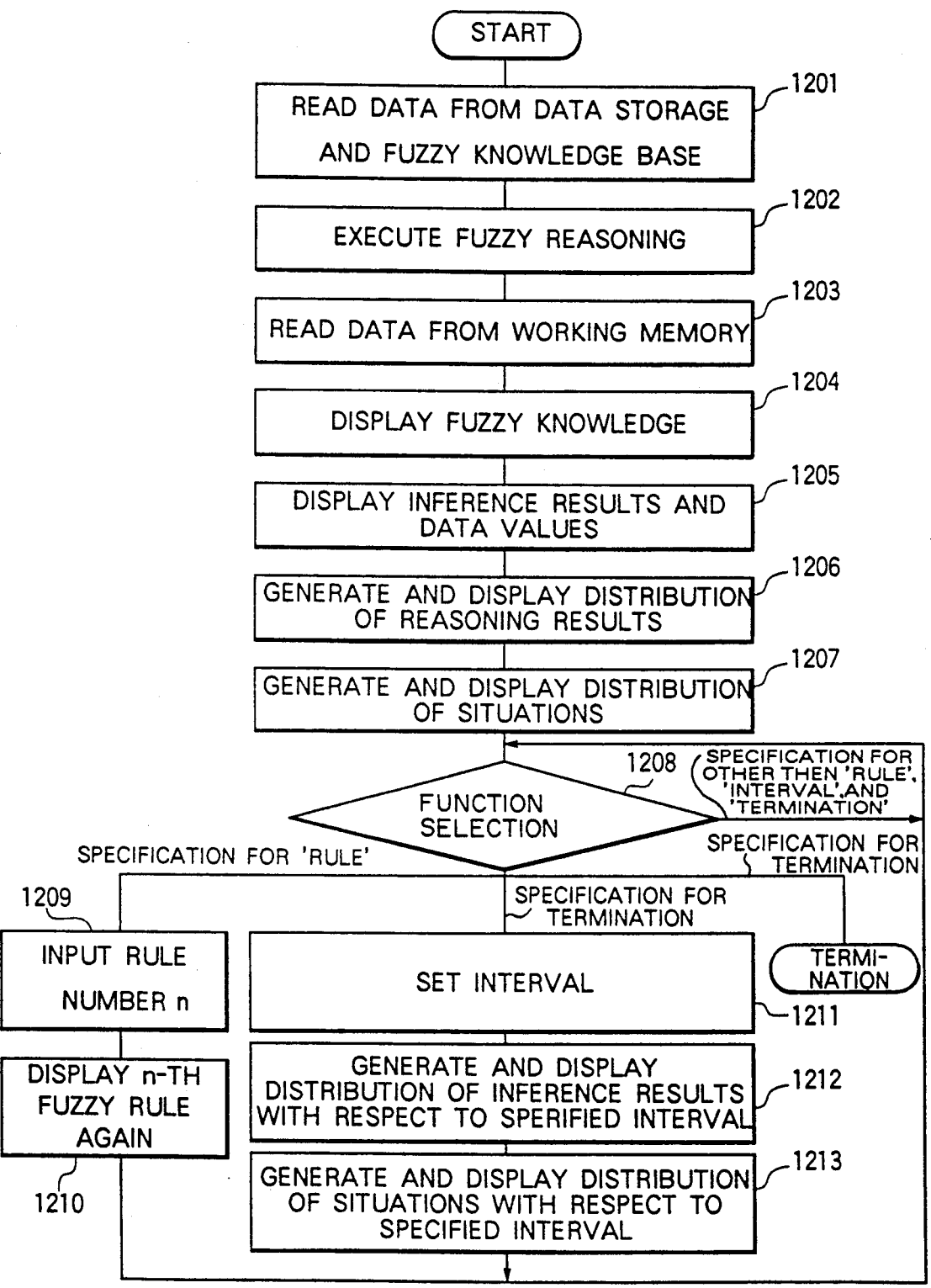
FIG. 12 is a flowchart showing the another processing procedure of the fuzzy evaluation system according to the present invention.

FIG. 12 is a flowchart showing further another processing procedure employed in the fuzzy evaluation system according to the present invention.

Figure 13:
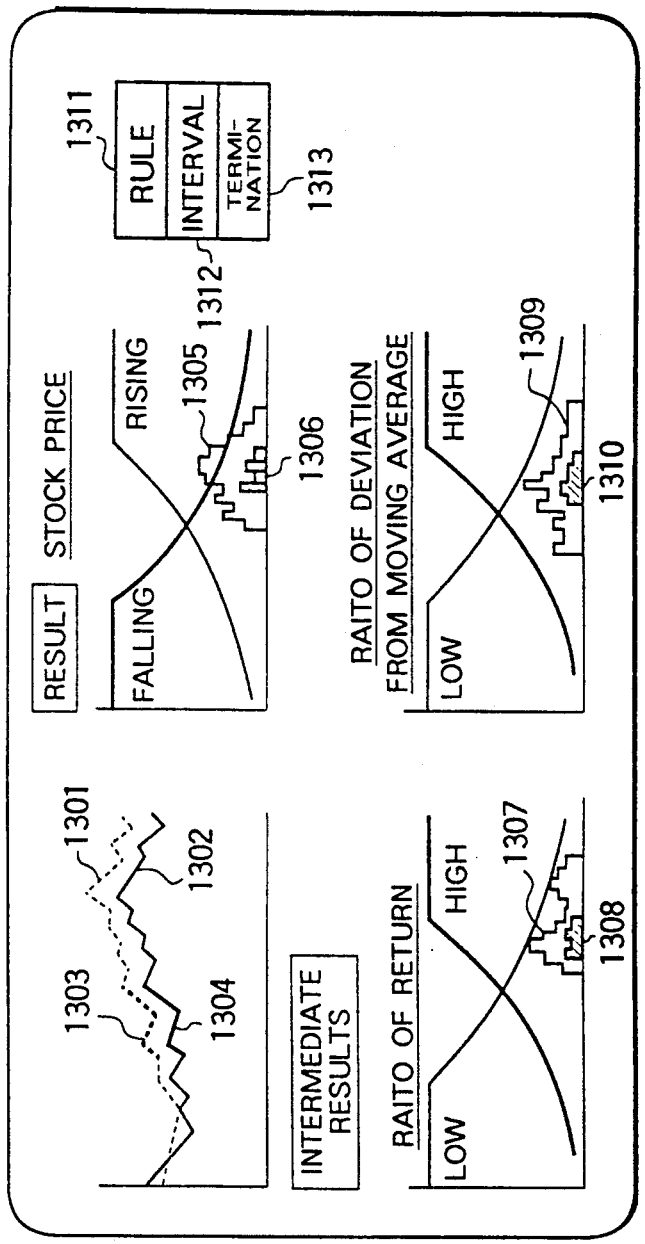
FIG. 13 is a diagram showing a screen display example including the fuzzy knowledge, distribution of situation, distribution of reasoning results, etc.

FIG. 13 shows an example of a screen image produced in the embodiment. The screen image of FIG. 13 includes a broken-line graph 1301 presenting inference results, a broken-line graph 1302 of stock prices (time series data), a partial broken-line graph 1303 of inference results in an interval specified by the user, a partial broken-line graph 1304 of stock prices in an interval designated by the user, a histogram 1305 showing a distribution of inference results produced from the broken-line graph 1302, a histogram 1306 showing a distribution of inference results produced from the partial broken-line graph 1304, a histogram 1307 representing a distribution of ratios of return of cases for which the inference results are presented by a broken-line graph 1301, a histogram 1308 of a distribution of ratios of return of the cases for which the inference results are presented by a partial broken-line graph 1303, a histogram 1309 of a distribution of ratios of deviation from the moving average of the cases for which the inference results are presented by a broken line graph 1301, a histogram 1310 of distribution of ratios of deviation from the moving average of the cases for which the inference results are presented by a partial broken line graph 1303, a field 1311 for selecting a function to display again a fuzzy rule, a field 1312 for selecting a function to extract inference intermediate results and final results for the time series data being currently displayed, the results being associated with a characteristic interval, and a field 1313 for terminating the processing.

Next, with reference to FIG. 12, the operation of the embodiment will be described.

First, a step 1201 reads date from the data storage 10 and the fuzzy knowledge base 11. The fuzzy reasoning unit 12 sequentially achieves a fuzzy inference on ratios of return and ratios of deviation from the moving average of the respective cases by use of the contents of the fuzzy knowledge base 11, thereby storing intermediate and final results of the reasoning operations in the working memory 13 (step 1202). Subsequently, the working memory 13 is accessed to read information from the intermediate result area 42 and the result area 41 (step 1203); moreover, associated membership functions attained from the fuzzy knowledge base 11 are presented on the CRT 15 (step 1204). For example, in the case of FIG. 13, in the graphs shown in the upper-right and lower portions of the screen image, lines of functions rising toward the right or falling toward the left represent membership functions. The membership functions shown in the upper-right portion and in the lower portion are respectively adopted in the then and if parts of fuzzy rules.

The stock prices thus obtained by the editor unit 14 in the step 1201 are displayed in an order of time series on the CRT 15; moreover, results of fuzzy reasoning operations carried out on the respective cases are attained from the result area 41 of the working memory 13 to be similarly presented on the CRT 15 (step 1205). For example, in the case of FIG. 13, the graph in the upper-left corner of the screen is an output example resultant from the step 1205. In this broken-line graph, the abscissa and the ordinate stand for the data (month and day) and the stock price, respectively. In this connection, a broken-line graph 1302 of solid lines and a broken-line graph 1301 of dotted lines are respectively related to stock prices (data values) and results of fuzzy reasoning.

Thereafter, based on contents of the result area 41 of the working memory 13, a histogram is produced to represent a distribution of inference results in a manner similar to the processing manner used in the embodiment 1, thereby displaying the histogram on the CRT 15 (step 1205). For example, in the case of graphs of FIG. 13, the stock prices resultant from the reasoning operation are presented in the histogram 1305.

Moreover, based on situation values of the respective cases loaded in the data storage 10, a histogram is created to represent a distribution of situations in the same way as for the embodiment 1, thereby displaying the histogram on the CRT 15 (step 1207). For example, in the case of images of FIG. 13, distributions of the situation values "ratio of return" and "ratio of deviation from the moving average" are presented in the histograms 1307 and 1309, respectively.

After the preparative operations above are completely achieved, the system waits for a user's action for selecting a function (step 1208). Under this condition, when the user specifies the field "rule" 1311 by a mouse, the system instructs the user to subsequently input a rule number n (step 1209). In response thereto, a membership function related to an i-th fuzzy rule is again displayed with a bold line (step 1210). In the graphs of FIG. 13, a membership function is presented with a bold line in association with the second fuzzy rule.

Furthermore, in the step 1208, when the user specifies the field "interval" 1312 by a mouse, the system instructs the user to further specify both ends of an interval in the upper-left portion of the screen of FIG. 13 by the mouse. In response to the operations, the editor unit 14 displays again with bold lines the partial brokenline graphs 1303 and 1304 in the specified interval (step 1211). Thereafter, a distribution of inference results of the respective cases in the interval specified in the step 1211 is generated in the similar manner as for the step 1206 to display the distribution on the CRT 15 (step 1212). For the graphs 1303 and 1304 in the specified interval of FIG. 13, the system produces a histogram 1306 from the inference results. The system then creates a distribution of inference results of the respective cases in the interval specified in the step 1211 in the similar manner as for the step 1207 to display the distribution on the CRT 15 (step 1213). For example, distributions of situations "ratio of return" and "ratio of deviation from the moving average" with respect to the graphs 1303 and 1304 in the specified interval of FIG. 13 are attained to be displayed as histograms 1308 and 1310.

After the execution of the step 1210 or 1213 or after the user specifies other than the rule 1311, the interval 1312, and the termination 1313 in the step 1208, control is passed to the step 1208.

Moreover, when the user selects the termination field 1313 in the step 1208, the processing is completely terminated.

According to the embodiment, since there are displayed relationships between the reasoning results and situation values of membership functions of the respective fuzzy rules, the user can easily determine locations of the fuzzy knowledge to be modified.

Next, a description will be given of another embodiment to which the present invention is applied. In this description, emphasis is particularly placed on fuzzy rules and fuzzy reasoning as fundamentals of the present invention and a method of verifying adequacy of fuzzy rules.

Know-how attained from experienced persons or experts is represented in the form of a fuzzy rule as follows.

if $\{(A_1 \text{ is } \alpha_1) \wedge (A_2 \text{ is } \alpha_2)...\}$ then $(B_1 \text{ is } \beta_1)$ (2)

Figure 16:
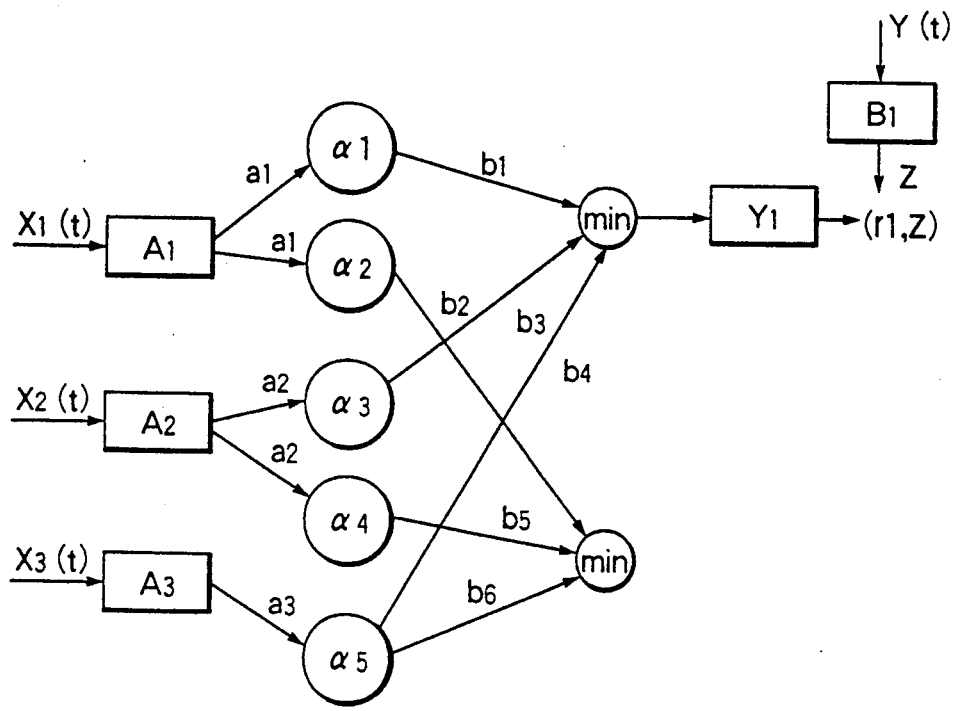
FIG. 16 is a schematic diagram showing a logic used to compute a membership function value of an IF part.

In this expression, "$A_1$ is $\alpha_1$" is specifically a statement such as "temperature ($A_1$) is high ($\alpha_1$)". Quantity of ambiguity associated with "high" is represented by a fuzzy membership function. A fuzzy rule of the expression (2) is represented by use of fuzzy membership functions as shown in FIGS. 15A to 15C. In the computer, a group of rules in the form of the expression (2) and fuzzy membership functions related thereto as shown in FIGS. 15A to 15C are stored as fuzzy rules in a knowledge base. FIG. 16 shows a network representation of a fuzzy reasoning achieved with the fuzzy rules. Based on quantities of situation $x_1(t)$, $x_2(t)$, $x_3(t)$, etc. (e.g. temperature) adopted for a fuzzy inference, situation values $A_1, A_2, \ldots, A_n$ are computed in the fuzzy reasoning. Resultant values are represented as $a_1$, $a_2$, and so on. Using $a_i$ ($i=1, 2, \ldots$), there are computed values $b_1, b_2, \ldots, b_n$ of the membership functions respectively related to quantities of fuzziness $\alpha_1, \alpha_2, \ldots, \alpha_n$. Moreover, in order to obtain a grade of adaptation or conformity of the if part, the minimum value is selected from the membership function values bi associated with $\{A_1 \text{ is } \alpha_1\}$. The conformity degree $\gamma_i$ thus computed is multiplied by the membership function of the then part (consequent) to attain a grade of rule for the pertinent fuzzy rule.

Figure 17:
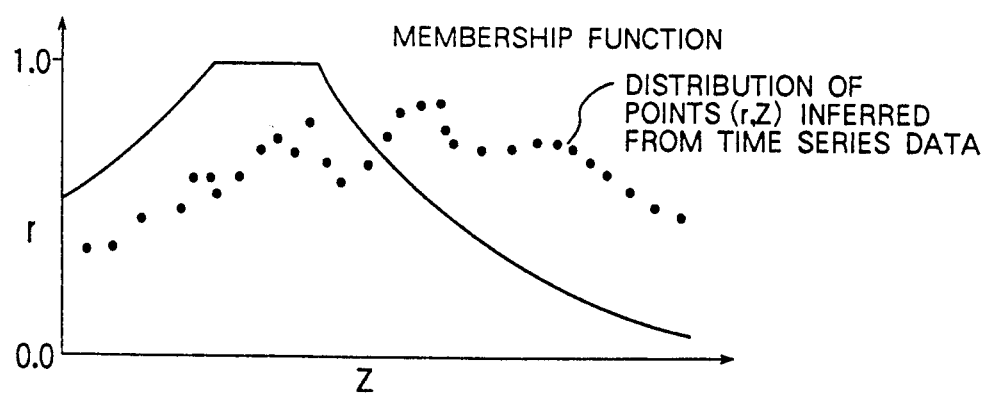
FIG. 17 is a graph showing a distribution of time series data with respect to a membership function.

In the fuzzy rule reasoning, when the inference results match the values of the solid line, the value of the adaptation grade $\gamma_i$ of the if part or antecedent is to take a large value; whereas, when the results do not match the solid line, the conformity grade of the antecedent should take a small value. Otherwise, a wrong inference result is to be attained. FIGS. 16 and 17 show, from this point of view, a concept of verification for determining adequacy of a fuzzy rule based on time series data. In the procedure of FIG. 16, corresponding to the time series data to be employed in the fuzzy reasoning, grades of rule $\gamma_i$ can be computed for the antecedent or if part. On the other hand, based on the time series data, values associated with situations Bi of the consequent or then part can be attained. Using time series data in a predetermined period of time, there can be obtained a distribution of sets ($\gamma_i$, Zi) of conformity grades $\gamma_i$ of the if part and situation values Zi of the then part. Depending on whether or not the distribution is adequate with respect to the membership function of the consequent, it is determined whether or not the pertinent rule is changed with respect to time for the preset time series data. FIG. 17 shows an example of a graph presenting the membership function m(Z) of the then part and the distribution of situation values ($\gamma$, Z).

As a measure of adequacy of a fuzzy rule, a correlation degree may be obtained between the membership function of the then part and the distribution ($\gamma$, Z). The correlation degree may be computed as follows. Namely, based on a set of pairs (($\gamma_i$, $Z_i$); i=1, ..., N (i stands for quantity of time series data at time ti)) attained from the time series data, a correlation degree is computed from the membership function values m(Zi) with respect to Zi and the conformity degree $\gamma_i$ as follows.

$$R = \frac{\sum_{i=1}^{N} \gamma_i m(Zi)}{\sqrt{\sum_{i=1}^{N} \gamma_i^2} \sqrt{\sum_{i=1}^{N} m^2(Zi)}} \quad (3)$$

This leads to the following conclusions. If the correlation degree takes a large value, the pertinent fuzzy rule is adequate; otherwise, the rule is inadequate. As above, based on the time series data, adequacy of each fuzzy rule can be verified. Moreover, when the distribution of values ($\gamma$, Z) attained from the time series data is deviated, there may be adopted a method of computing an inappropriate grade for a membership function, the grade being represented as a distance between the resultant distribution and the membership function of the then part. The computation method will be later described in detail.

Figure 14:
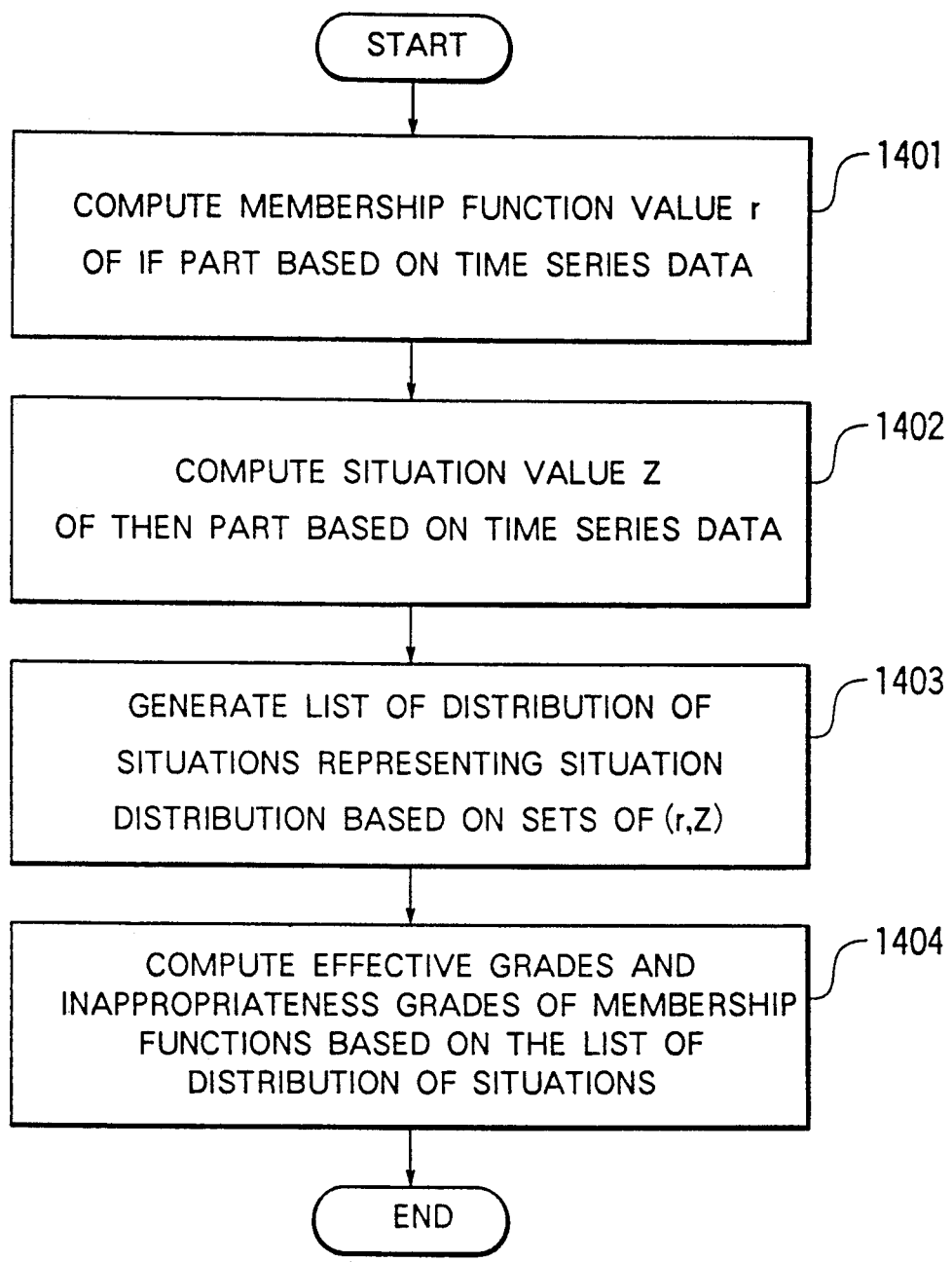
FIG. 14 is a flowchart showing the processing procedure adopted to compute effective grades and in appropriateness grades of membership functions from time series data.
Figure 18:
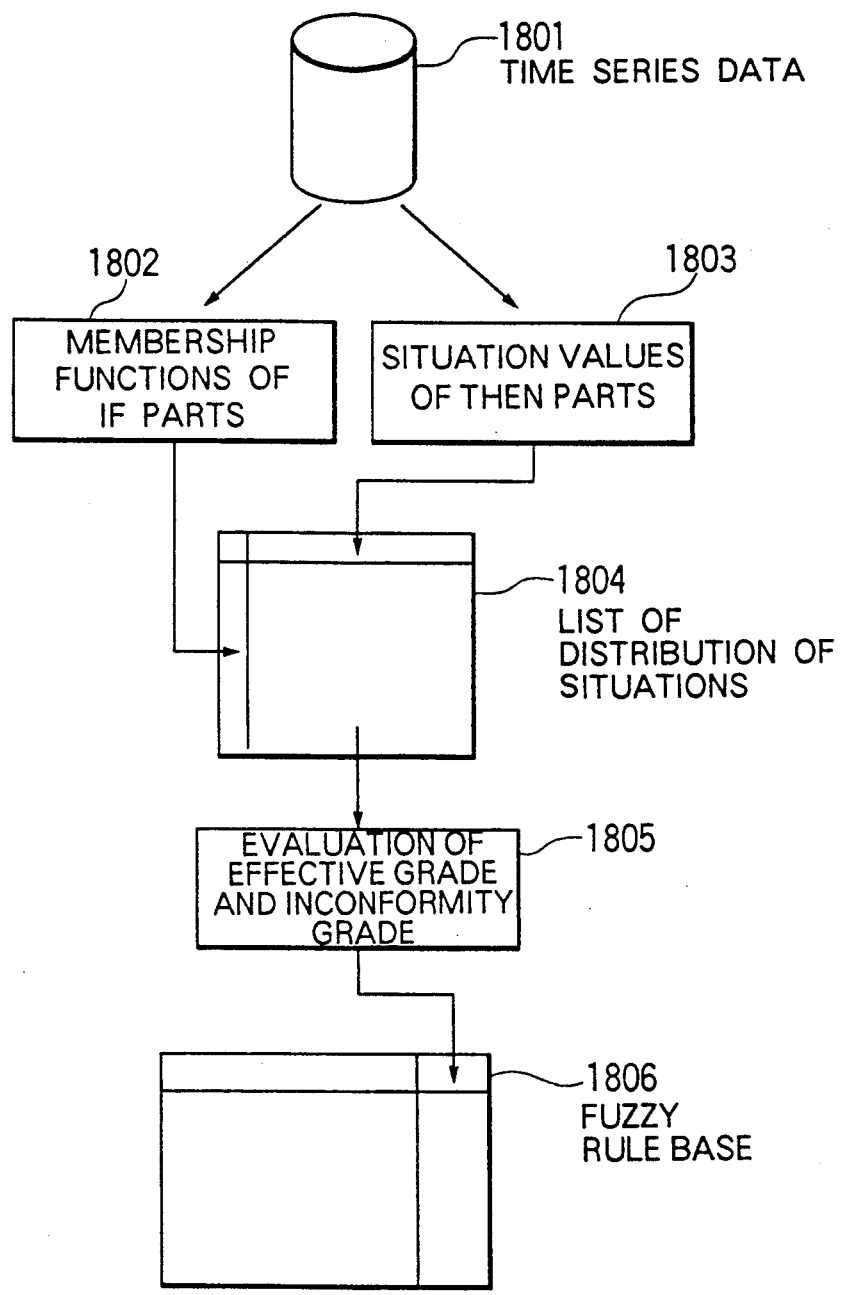
FIG. 18 is a diagram showing data and a processing flow employed to compute effective grades and in appropriateness grades of membership functions from time series data.

FIG. 14 is a processing flow showing a procedure of evaluating a membership function based on the time series data as above. Referring now to FIG. 14 and FIG. 18 illustratively showing the processing procedure, a description will be given of the processing flow. In the flowchart of FIG. 14, a step 1401 computes a value of a membership function 1802 of the if part depending on time series data 1801. A step 1402 then obtains values of situation 1803 of the then part from the time series data 1801. Thereafter, a step 1403 processes results from the steps 1401 and 1402 to create a list of distribution of situations 1804 associated with the pertinent rule. A step 1404 computes from the contents of the distribution situation list 1804 effective grades and inconformity or inappropriateness grades of the membership function to obtain data to be stored in a fuzzy rule base 1806.

Figure 19:
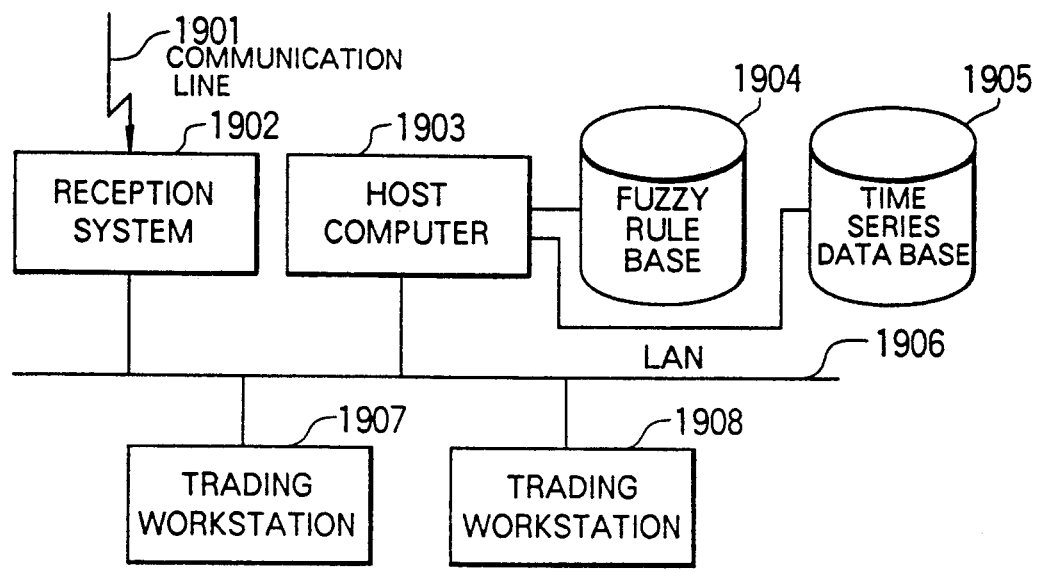
FIG. 19 is a diagram showing the configuration of a trading support system.

A description will be next given to an example of application of the present invention wherein a fuzzy decision procedure is adopted in a securities trading decision support system related to securities such as stocks and bonds in which rising and falling tendencies of stock and bond prices are estimated. Prices of stocks and bonds vary depending on environments such as a change in the rate of interest. FIG. 19 shows the constitution of the securities trading decision support system using fuzzy rules.

In the system of FIG. 19, realtime stock price information of stocks and bonds is received via a communication line 1901 by a data receiving system 1902. Received data are then transmitted via a local area network (LAN) 1906 to a host computer 1903 and trading workstations 1907 and 1908. The host computer 1903 accesses a fuzzy rule base 1904 and a time series data base 1905 storing therein time series data of bond prices and the like to conduct a fuzzy reasoning so as to estimate increase or decrease in the securities prices. Results from the fuzzy inference are sent to the trading workstation 1907.

Figure 20:
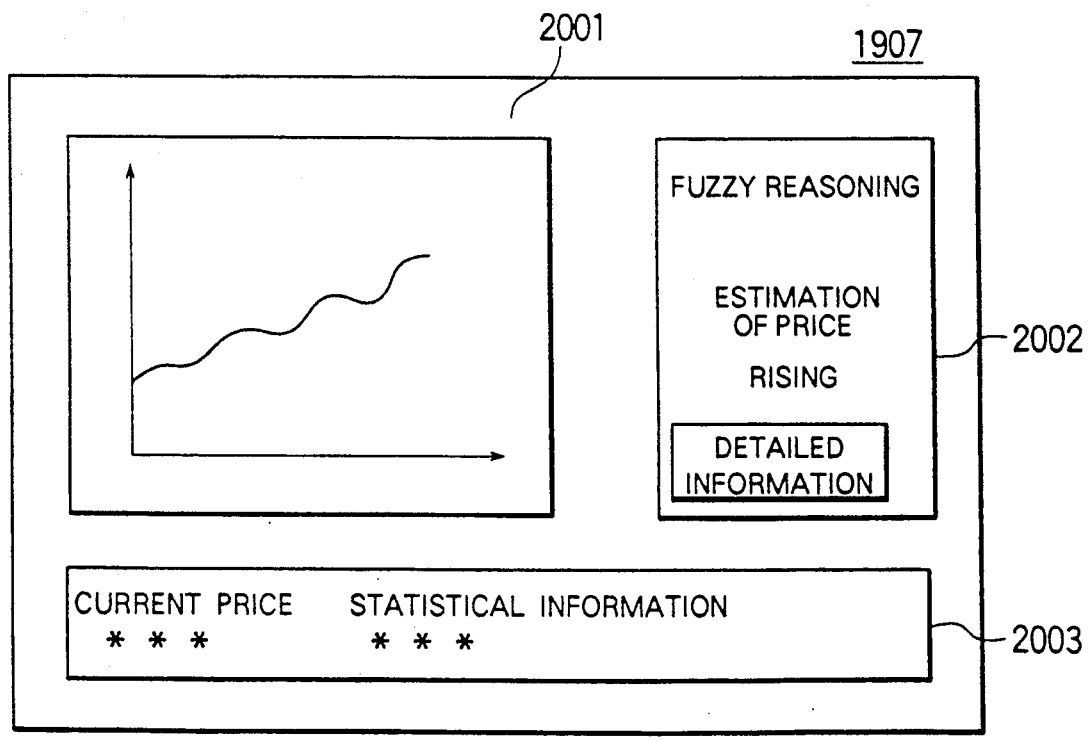
FIG. 20 is a schematic diagram showing an example of a trading support screen.
Figure 22:
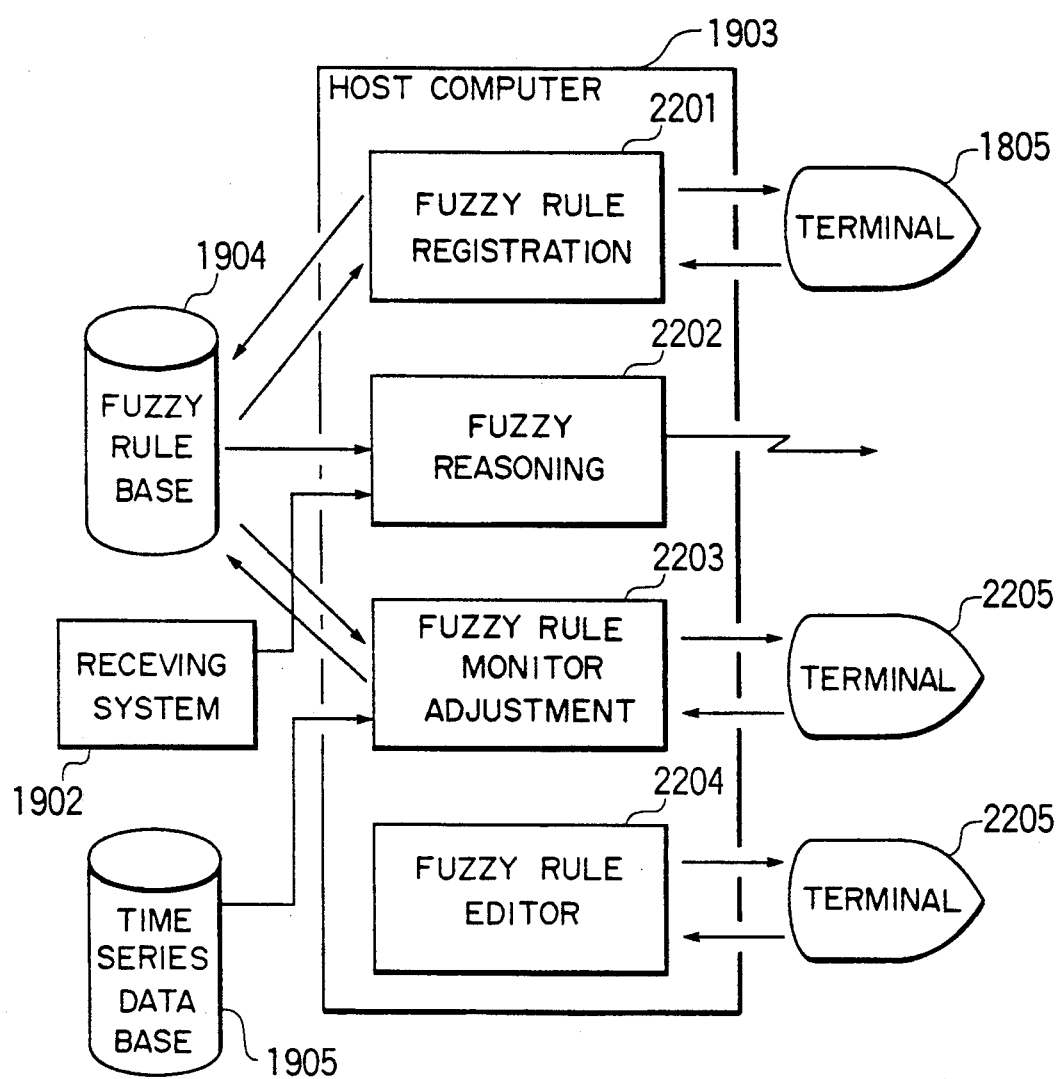
FIG. 22 is a diagram showing fuzzy processing procedures in a host computer.

FIG. 20 shows a screen display example developed on the trading workstation 1907. This example using a multiwindow display presents windows 2001, 2002, and 2003 respectively displaying a graph of time series data of bond prices, information of price estimation resultant from the fuzzy reasoning, and current and statistical information of bond prices. FIG. 21 shows the configuration of the fuzzy rule base 1904. Data of the fuzzy rule base 1904 comprise a group of fuzzy rules each including a rule number 2101, an effective grade 2103, availability flag 2104, and a fuzzy membership function 2102. FIG. 22 shows functions necessary to develop operations of the realtime decision support system based on the fuzzy knowledge. In this description, the fuzzy knowledge processing is to be accomplished by the host computer 1903 in this embodiment. When achieving the decision support processing in a field of business, the host computer 1903 is required to develop the following functions.

(1) Fuzzy rule registration and evaluation processing 2201
(2) Fuzzy reasoning processing 2202
(3) Fuzzy rule monitor adjusting processing 2203
(4) Fuzzy rule monitor editing processing 2204

Heretofore, in a field such as a fuzzy control to which the fuzzy theory is applied, once fuzzy rules are determined, the fuzzy rules can be used for a long period of time. Consequently, in the functions above, the item (3) "fuzzy rule monitoring processing 2203" has not been necessary. However, in a decision support system such as a trading support system, the fuzzy rule monitoring processing 2203 is inevitably disposed. This embodiment is characterized in that the function above is employed in the fuzzy decision support system to evaluate a degree of adequacy and an effectiveness of a rule based on time series data developed in the past.

Referring to FIG. 22, a description will be next given of operations of the respective function blocks.

Figure 23:
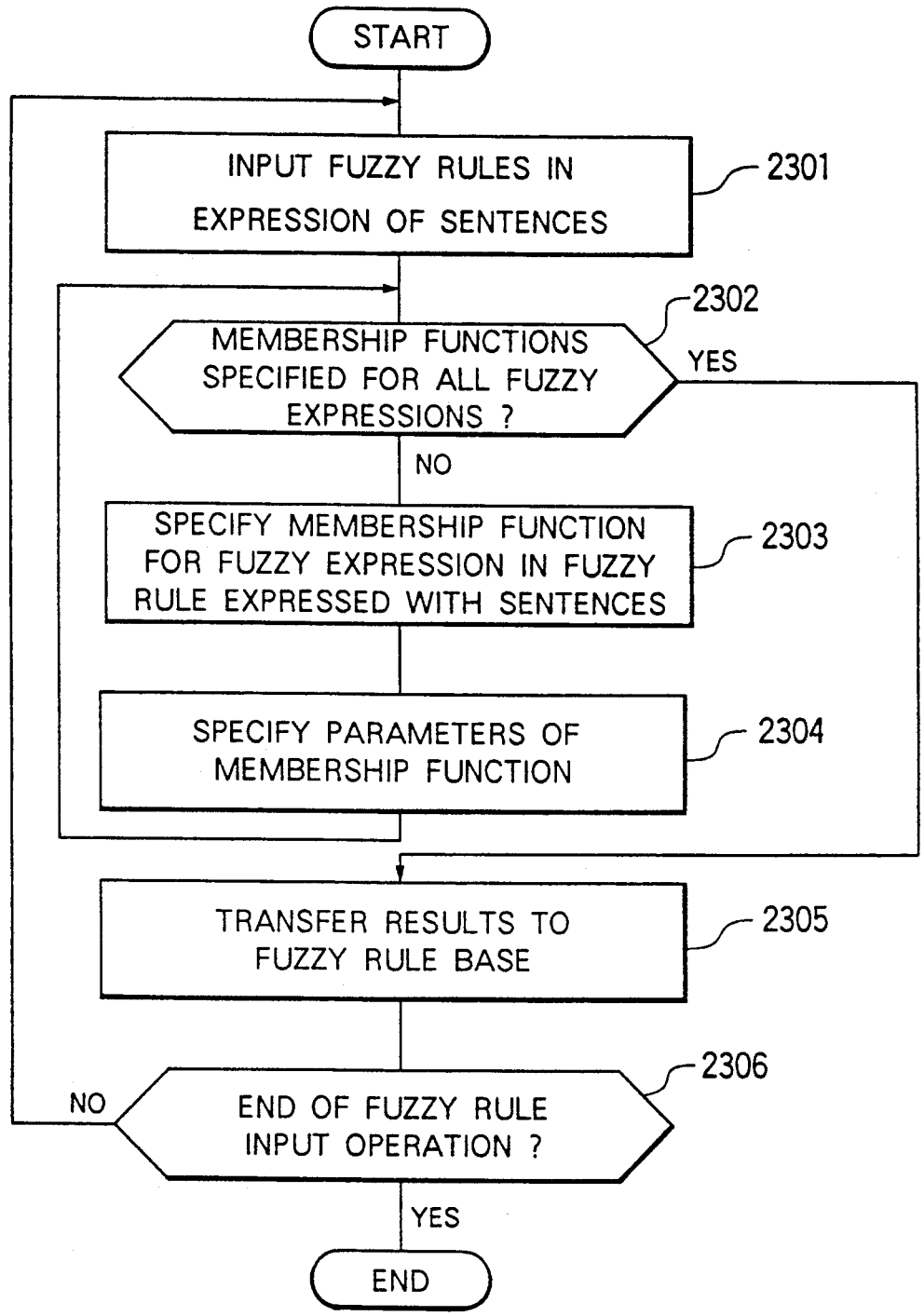
FIG. 23 is a flowchart showing the operation of a fuzzy rule registration.

First, for fuzzy rules used in the present invention, the format and the registration method thereof will be described according to the flowchart of FIG. 23 associated with the fuzzy rule registration processing 2201. In this flowchart, a fuzzy rule is first inputted as a statement in the format of $$\text{if } \{(A_1 \text{ is } \alpha_1) \wedge (A_2 \text{ is } \alpha_2) \wedge \ldots \wedge (A_n \text{ is } \alpha_n)\}$$

$$\text{then } (B_1 \text{ is } \beta_1) \tag{2}$$

(step 2301). In the expression above, $A_1, A_2, \ldots, A_n$, and $B_1$ respectively denote names of situations or variables such as stock prices and quantities of transactions and $\alpha_1, \alpha_2, \ldots, \alpha_n$, and $\beta_1$ respectively stand for expressions in a language associated with quantities of fuzziness such as "high" and "large". Next, the fuzzy representations $\alpha_1, \alpha_2, \ldots, \alpha_n$, and $\beta_1$ are sequentially assigned with fuzzy membership functions (step 2302). From the terminal apparatus 2205, the operator first selects a membership function from the membership functions in the form of $f_1, f_2, \ldots$, and $f_M$ prepared by the fuzzy rule registration 2201 of the system to be assigned to the fuzzy representations $\alpha_1, \alpha_2, \ldots, \alpha_n$, and $\beta_1$ (step 2303). For the designated membership function, parameters (a range, a gadient, etc.) are specified (step 2304). When all the fuzzy representations are assigned with respective membership functions, the pertinent fuzzy rule is transferred to the fuzzy rule base 1904 (step 2305) to be stored in a free location or an unused location associated with the smallest rule number in the fuzzy rule base of FIG. 21. In this operation, the fields respectively of the effective grade Ri and the availability flag Fi for the rule i are respectively loaded with default values, namely, $Ri = 1.0$ and $Fi = 1$. It is assumed that Ri takes a real value ranging from 0.0 to 1.0; whereas, the value of Fi is 0 or 1 respectively denoting an available or unavailable state. As a result, a fuzzy rule is completely inputted to the system. When all rules are loaded in the fuzzy rule base 1904 as above, the processing is terminated (step 2306).

Subsequently, the fuzzy reasoning function 2202 of FIG. 22 is achieved according to an ordinary fuzzy inference. An example of description of this processing has been found, for example, in pages 330 to 336 of "Fuzzy Control Method and Application of Same to Real System" described by Yasunobu in the Transaction of the Institute of Electrical Engineers of Japan, Vol. 109-C, No. 5 (1989). In the embodiment above, since the effective grade Ri is adopted for each rule i, when $\mu_i(Z)$ is set as a membership function of the consequent or then part of the rule i, the operation to integrate or to combine results of the respective rules is achieved as described in the article above. Namely, in place of $$\mu(Z) = \max \mu_i(Z)/Z \tag{5}$$

there is used $$\mu(Z) = \max R_i \cdot \mu_i(Z)/Z \tag{6}$$

In the expressions above, (Z) designates a membership function for the final result attained through the operation above to combine the respective membership functions. Results of the fuzzy reasoning are displayed in the window area 2002 of FIG. 20.

Figure 24:
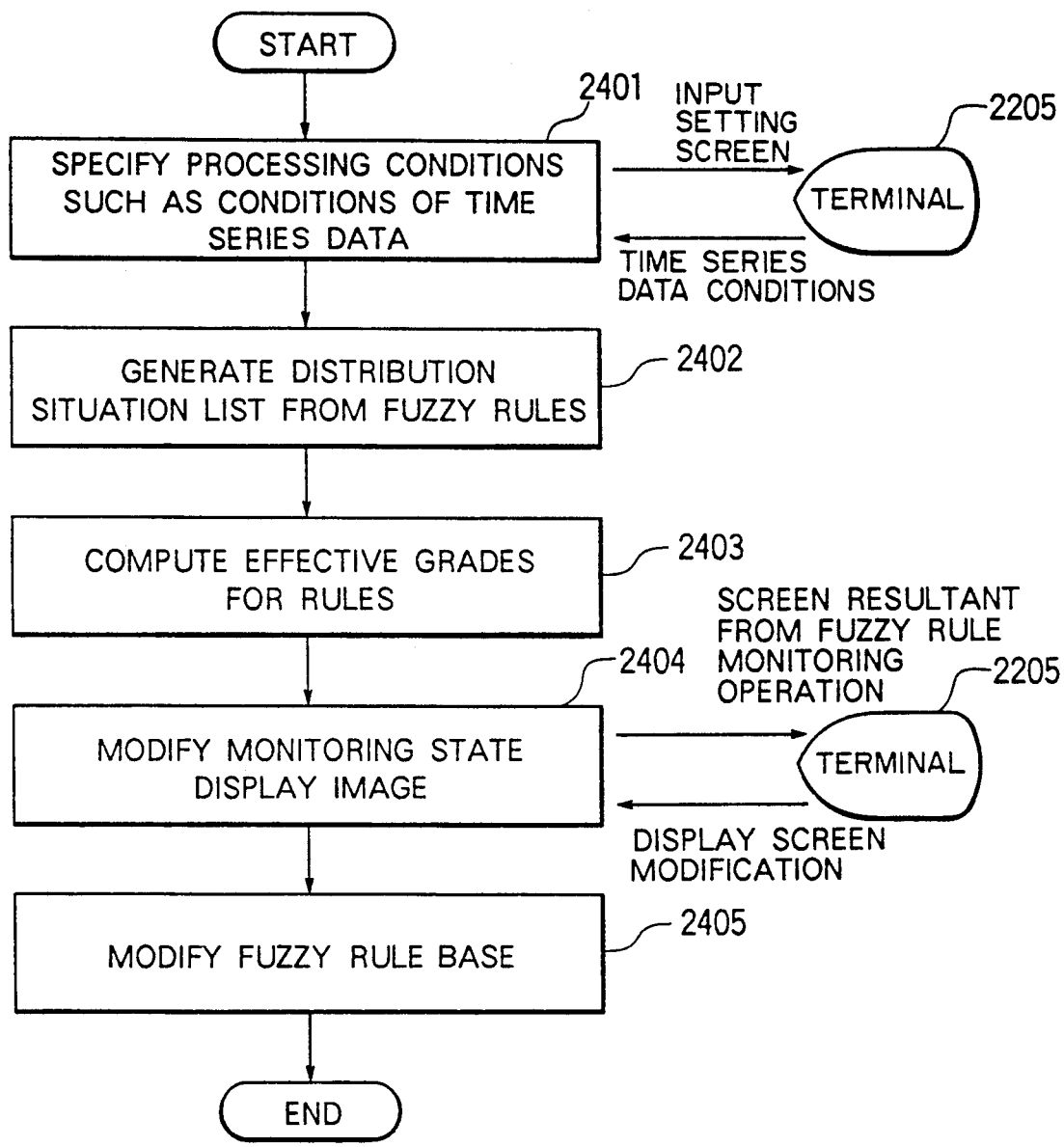
FIG. 24 is a flowchart showing the operation of a fuzzy rule monitor processing.
Figures 25, 26:
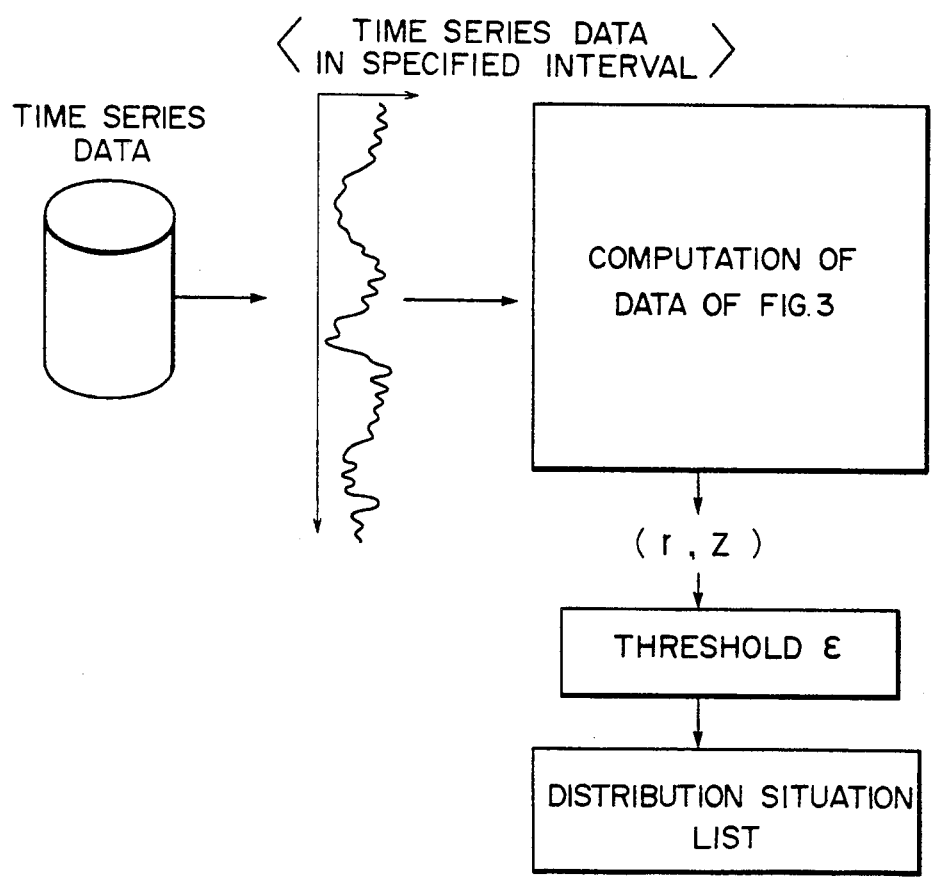
FIG. 25 is a diagram showing a condition setting screen used in the fuzzy rule monitor processing.
FIG. 26 is a diagram showing a data flow of processing adopted to generate a table of distribution of situation.
Figures 27, 28:
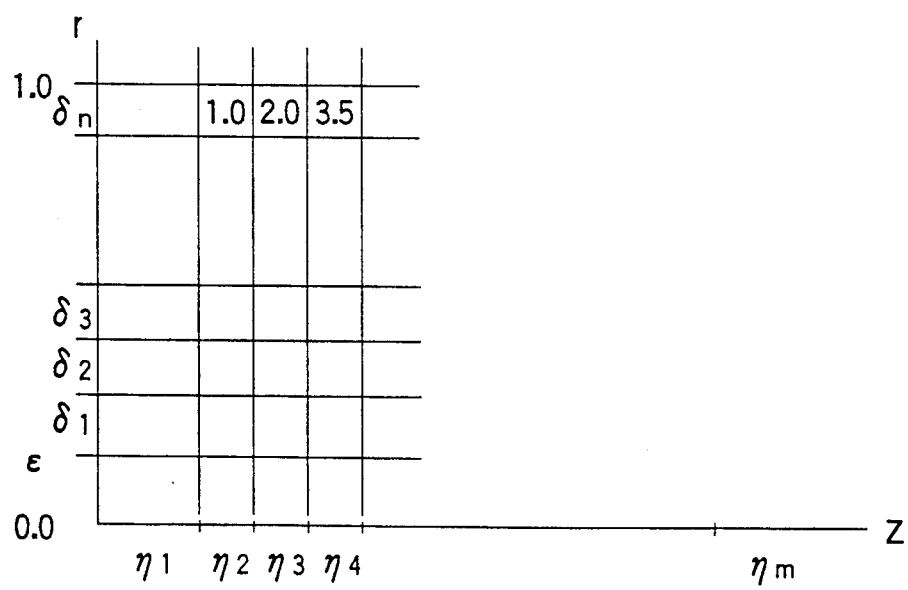
FIG. 27 is a diagram showing a table of distribution of situation.
FIG. 28 is an explanatory diagram useful to explain meanings of contents of the table of FIG. 27.

Next, a description will be given of the fuzzy monitor adjusting function 2203 of FIG. 22 which examines adequacy of the registered fuzzy rule for a change thereof with respect to time. The processing of this function 2203 is accomplished under conditions specified by the operator through a man-machine interactive processing (FIG. 25). FIG. 24 is a flowchart showing the operation of the fuzzy rule monitor adjusting function 2203. First, a step 2401 establishes conditions for computing an effective grade of a fuzzy rule such as conditions related to time series data for the fuzzy rule monitor adjustment. The computer presents a condition setting screen as shown in FIG. 25. For example, in this screen image, the system instructs the operator to specify weights Ki for intervals of the time series data to be used and periods $D_K$ to $D_{K+1}$ of the respective intervals. In response thereto, the operator inputs the weights and periods for the data i. Moreover, the condition setting screen of FIG. 25 includes a field in which the operator inputs a minimum threshold value $\epsilon$ of a condition for creating a list of distribution of situations, which will be described later. Under the conditions designated in the step 2401, a list of distribution of situations of FIG. 27 is produced for each fuzzy rule thus registered to the system. In order to create the distribution state list of FIG. 27, time series data specified in the screen of FIG. 25 are processed according to a procedure or method shown in FIG. 26. That is, the specified time series data are sequentially inputted to the computation mechanism of FIG. 16 (in a case of daily data, for example, a daily amount of data is supplied at a time), thereby obtaining a conformity grade $\gamma$ of the if part and a situation value Z of the then part. When using time series data, there are produced a large number of pairs ($\gamma$, Z) of the conformity grade and the situation value. In order to remove insignificant pairs therefrom, the value of the minimum threshold denoted in the screen of FIG. 25 is employed to select only the pairs satisfying a condition of $\gamma > \epsilon$, thereby creating the distribution situation list of FIG. 27. This list is a table in the form of a matrix of which the vertical and horizontal axes stand for discrete values attained by dividing Z and $\gamma$ values, respectively. Each element of the table is loaded with a frequency of an associated pair ($\gamma$, Z). The contents of the matrix of FIG. 27 correspond to those of FIG. 28 in which two-dimensional coordinates are represented with discrete values. Namely, the table of FIG. 28 is loaded with data representing, when the range of $\gamma$ taking a value from $\epsilon$ to 1.0 is subdivided into zones ($\delta_1, \delta_2, \ldots, \delta_n$) and the range of Z is split into subregions ($\eta_1, \eta_2, \ldots, \eta_n$), the number of pairs ($\gamma$, Z) found in an area represented by $\eta_i \times \delta_i$ in the objective interval of time series data. Moreover, the weights specified from the screen of FIG. 25 for the time series data interval i may be reflected onto the table of FIG. 28. Namely, when a weight $K_K$ is assigned to a time series data interval associated with a resultant pair ($\gamma$, Z), an element M(i,]) of a matrix corresponding to the pertinent region $\eta_i \times \delta_i$ is represented as $$M(i,j) = (Mi,j) + K_K \tag{7}$$

thereby reflecting the weight of the time series data onto the frequency of the element of the matrix. It is assumed that the initial value of the element M(i,j) is 0. As described above, there is created a distribution situation table of FIG. 27 representing a distribution of ($\gamma$, Z) in the interval of the time series data specified from the screen of FIG. 25.

Figures 29, 30:
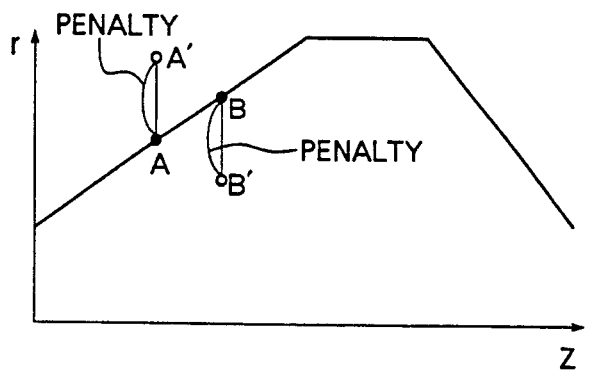
FIG. 29 is a diagram for explaining the grade of in appropriateness.
FIG. 30 is a diagram showing a display of the monitoring state.

Subsequently, using the list of distribution of situations thus created, a step 2403 of FIG. 24 computes an effective grade (or an inconformity grade) of the registered fuzzy rule. A correlation coefficient of the expression (3) may be adopted as an evaluation measure for the effective grade (or the inconformity grade) of the fuzzy rule. However, since the list of distribution of situations of FIG. 27 developed from the time series data cannot be considered to represent information of the complete distribution, it is assumed here that an inconformity grade denoting a grade of an inconformity or inappropriateness of the obtained distribution with respect to the established membership function is set as the evaluation measure of the fuzzy rule, which is represented in FIG. 29. That is, the inconformity grade of a fuzzy rule is defined by an average of distances between the membership function of the then part and the resultant distribution. The inconformity grade is computed as follows. For a rule l, by use of a value $m_e(\eta_i)$ of a membership function associated with a central point of an interval $\eta_i$ with respect to Z, an evaluation function (or a penalty function) $P_l$ of the inconformity grade is computed from the following expression $$P_l = \frac{\sum_{i=1}^{m} \sum_{j=1}^{n} M(i,j) \cdot (m_e(\eta_i) - \delta_j)^2}{\sum_{i=1}^{m} \sum_{j=1}^{n} M(i,j)} \tag{8}$$

In this connection, in a fuzzy reasoning, a membership function having a greater value develops a larger contribution to the inference result. In consequence, an index L designating a degree of difference of the value of the conformity grade of an if part exceeding a specified threshold $\xi$ by using a distribution of the overall time series data as follows.

$$L_l = \frac{\sum_{i=1}^{m} \sum_{j=1}^{n} M'(i,j)}{\sum_{i=1}^{m} \sum_{j=1}^{n} M(i,j)} \tag{9}$$

Where, the computation is achieved for the value $\gamma$ of the conformity grade of the if part exceeding the threshold $\xi$ under the following conditions.

$$M'(i,j) = M(i,j) + K_k \text{ if } \gamma \geq \xi$$
$$M(i,j) \quad \text{if } \gamma < \xi$$

Next, a step 2404 of FIG. 24 sorts the results attained in the step 2403 in a descending sequence of the values of inconformity grade to present the ordered results in the form of a table on a display. FIG. 30 shows an example of the table produced in the step 2404. In the table configuration of FIG. 30, the contents of fuzzy rules and computed values such as $P_l$ and $L_l$ are listed in the sorting order. Of the attained information, a portion A includes contents of the existing fuzzy rule base; whereas a portion B comprises values of $P_l$ and $L_l$ computed on the step 2403. In this example, a new effective grade is attained as a function of $P_l$ and $L_l$ so as to display the result as a reference effective value. The new effective grade may be obtained, for example, as follows.

$$P_I = 1/(1 + P_I) \quad (10)$$

Figure 31:
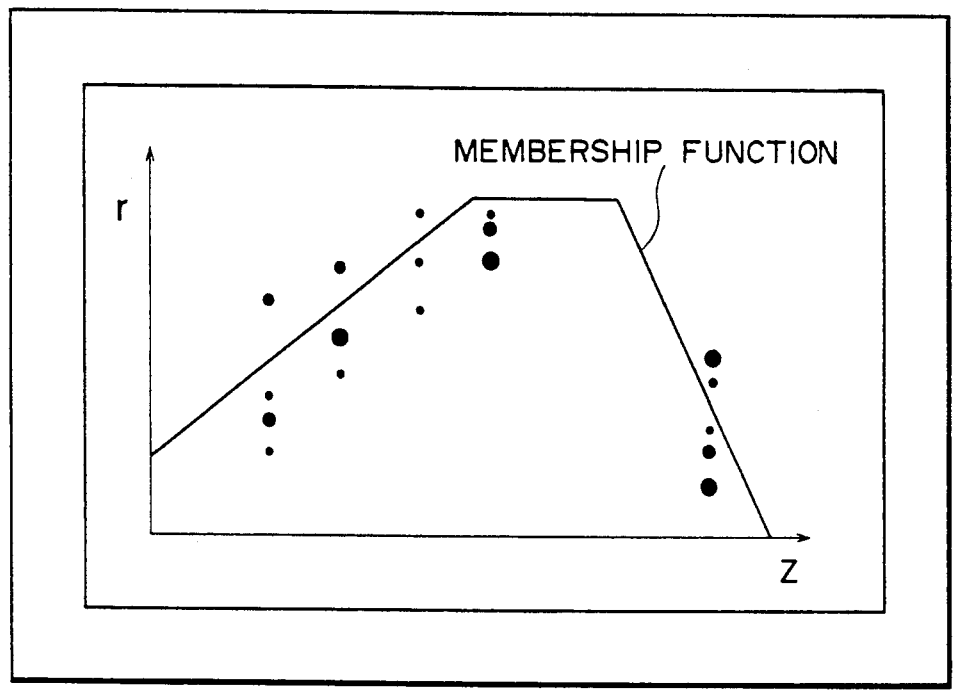
FIG. 31 is a diagram showing a membership function and a distribution of situation.

It is assumed here that for an availability flag of the portion B, the content of the existing rule base is displayed to be modified by the operator if necessary. While visually confirming the contents of the table of FIG. 30, the manager of the fuzzy knowledge rule or the operator or the system modifies the value of the new effective grade according to own judgements or feelings. In this operation, since information of the list of distribution of situations shown in FIG. 27 is also necessary, when the operator specifies a rule number by the mouse or from the keyboard, the system presents a display image including the distribution situation list related to the specified rule number and the membership function. FIG. 31 shows an example of the composite display above. In the graph of FIG. 31 produced from the elements of the matrix of the distribution situation list, each element of the matrix is presented with a dot having a size corresponding to the value assigned to the element. While examining the contents of displayed image, the operator judges the distribution of situations and the inconformity grade of rule to set the effective grade and the availability flag.

When the step 2404 of FIG. 24 completes the processing, a step 2405 stores the values of the effective grade and the availability flag in the fuzzy rule base, thereby terminating the fuzzy rule monitor adjusting operation of FIG. 24. FIG. 22 shows a second embodiment according to the present invention, which has, in addition to the functions above, a fuzzy rule editor function identical to the fuzzy rule registration function. Namely, this function is used, for example, to modify registered fuzzy rules and fuzzy membership functions and to add fuzzy rules.

In the embodiment above, although the effective grade Ri is in a range $0.0 \leq Ri \leq 1.0$, the upper limit of the effective grade Ri may exceed 1.0 for the following reason.

That is, the change in the rule with respect to time includes not only a case of deterioration thereof i.e. decrease in the value of Ri but also a case of increase in the Ri value. In the latter case, even if a condition of $Ri > 1.0$ appears, the system may conduct the processing, for example, under a condition of $Ri = 1.0$.

Next, a description will be given of the operation of the embodiment 2 of a learning system for achieving an operation to learn membership functions of the consequents (then parts) of fuzzy rules and effective grades of the respective fuzzy rules based on information of distribution produced from time series data.

In order to learn fuzzy rules based on the time series data to finally construct an adequate fuzzy rule system, the following two items are to be learned.
(1) Respective fuzzy rules
(2) Linkage relationships between fuzzy rules In this embodiment, it is assumed like in the case of the embodiment 2 that the fuzzy rule base is loaded with fuzzy rules based on knowledge of experts such that contents of the fuzzy rules are adjusted according to the time series data.

Figure 32:
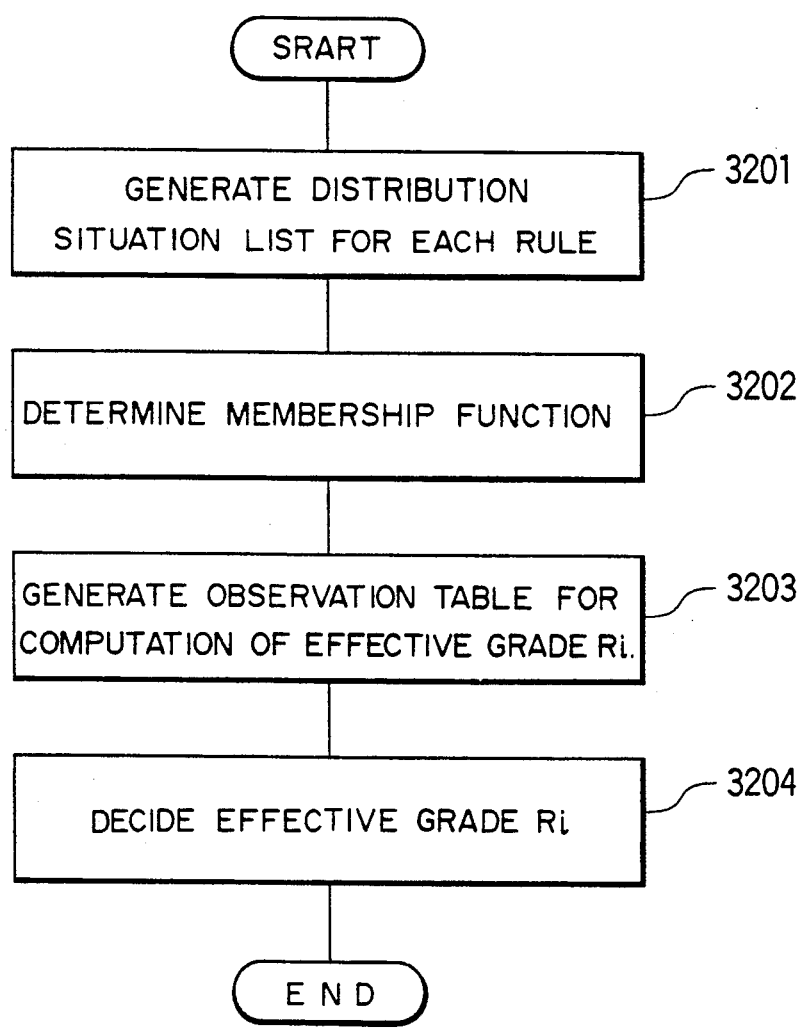
FIG. 32 is a flowchart showing the operation of a learning process of fuzzy knowledge.
Figure 33A:
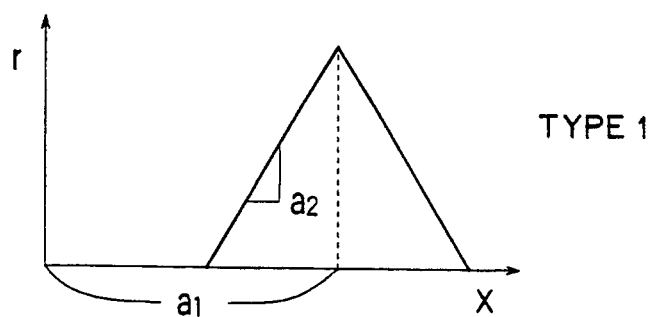
FIGS. 33A and 33B are graphs showing membership functions and parameters.
Figure 33B:
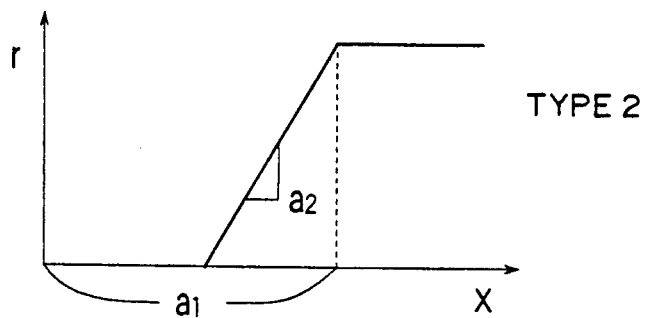

FIG. 32 is a flowchart showing the operation to learn fuzzy rules according to the present invention. First, a step 3201 generates for each fuzzy rule a list of distribution of situations as shown in FIG. 27 from the time series data. This processing includes two steps of FIG. 24 associated with the second embodiment, namely, the step 2401 (specification of processing conditions such as conditions to be employed when the time series data is processed) and a step 2402 (creation of the distribution situation list from the fuzzy rule). Next, a step 3202 determines, based on the distribution situation list thus created (FIG. 27), a contour of the membership function of the then part as follows. Namely, parameters of the membership function and a type thereof are decided so as to minimize the value of the penalty function represented by the expression (8) in association with the relationships between the distribution attained from the list of FIG. 27 and the membership function. FIGS. 33A and 33B show examples of the types and parameters of the membership function. In these examples, the membership function of a type 1 has a triangular shape with parameters of a center-line position $a_1$ of the triangle and a gradient $A_2$ thereof; whereas, the membership function of a type 1 has a trapezoidal shape with parameters of a starting point $a_1$ of the upper side line of the trapezoid and a gradient $a_2$ thereof. The membership function of type I is assumed to be represented as $f_I(X, a_1^I, a_2^I, \ldots, a_l^I)$, where X denotes a range of values of variables or situation values of the membership function and $a_1^I, a_2^I, \ldots,$ and $a_l^I$ are parameters included in the membership function of the type I. FIG. 34 is a flowchart showing the operation to decide a membership function which minimizes the quantity of penalty computed from the expression (8). First, a method of minimizing the penalty function will be described. Let us assume that intermediate points $\eta_1', \eta_2', \ldots$ and $\eta_m'$ respectively of the intervals $\eta_1, \eta_2, \ldots,$ and $\eta_m$ of the range Z and intermediate points $\delta_1', \delta_2', \ldots,$ and n respectively of the intervals $\delta_1, \delta_2, \ldots,$ and $\delta_n$ of the range $\gamma$ associated with the distribution situation table 1804 of FIG. 18 are set as representative points for a membership function $f_I(X, a_1^I, a_2^I, \ldots, a_l^I)$. At the point $\eta_i'$, the membership function $f_I$ takes a value expressed as $$f_I(\eta_1', a_1^I, a_2^I, \ldots, a_l^I) \quad (11)$$

In this case, the total of penalty in the interval is obtained from $$\sum_{j=1}^{n} M(i, j)(f_I(\eta_1', a_1 I, \ldots, a_l I) - \delta_j')^2 \quad (12)$$

and the sum of totals of penalty in all regions considered is represented as $$\sum_{i=1}^{m} \sum_{j=1}^{n} M(i, j)(f_I(\eta_1', a_1 I, \ldots, a_l I) - \delta_j')^2 \quad (13)$$

where, M(i, j) stands for a value of an element (i, j) of the matrix of the distribution situation table of FIG. 27. The result attained by executing the expression (13) is penalty related to the membership function $f_I$. That is, the unknown parameters $a_1^I, a_2^I, \ldots, a_l^I$ of the expression (13) can be determined by solving a non-linear Optimization problem of $$\sum_{i=1}^{m} \sum_{j=1}^{n} M(i, j) \cdot (f_I(\eta_1', a_1 I, a_2 I, \ldots, a_l I) - \delta_j')^2 \rightarrow \min \quad (14)$$

Next, based on the parameters $(a_1*^I, \ldots, a_{l*}^I)$ obtained by solving the nonlinear optimization problem, the penalty PI iB computed as follows.

$$P_I = \sum_{i=1}^{m} \sum_{j=1}^{n} M(i,j)(f_I(\eta_1'^*, a_1*^I, \ldots, a_{l*}^I) - \delta_j')^2 \qquad (15)$$

Computing the penalty $P_I$ for various types of membership functions, the system selects a membership function $f_1*$ for which the computed value of the penalty takes the minimum value, thereby determining the membership function of the consequent of the pertinent fuzzy rule.

According to the concept or idea described above, the processing associated with the step 3202 of FIG. 32 can be specifically implemented as shown in FIG. 34. In the flowchart of FIG. 34, a step 3401 reads contents of the distribution situation list of the fuzzy rule I and initializes data such as an interaction count of a loop for the processing control. A step 3402 computes values of $\delta_j'$ and $\eta_i'$ ($i=1, \ldots, m; j=1, \ldots, n$) from the contents of the list and initializes values of parameters contained in the membership function. A step 3403 accomplishes a nonlinear optimization processing of the expression (14) to attain the optimal values for the parameters $(a_1*^I, \ldots, a_{l*}^I)$. Based on the resultant parameter values, a step 3404 computes the value of penalty from the expression (15). A step 3405 checks to determine whether or not the steps 3402 to 3404 have already been executed for all membership functions. A step 3406 selects therefrom a membership function related to the minimum value of the quantity of penalty. A step 3407 checks to determine whether or not all fuzzy rules have already been processed, thereby terminating the processing of FIG. 34.

Figure 35:
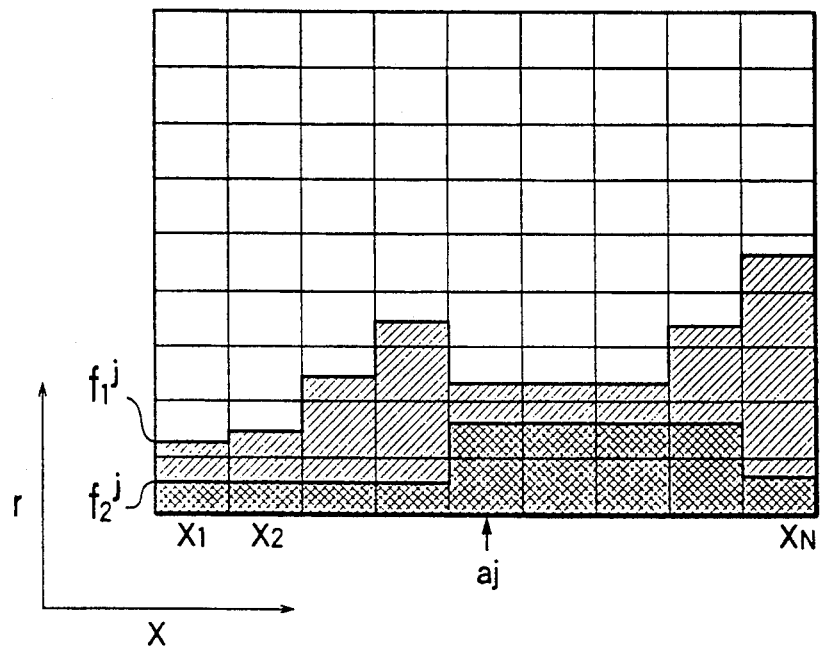
FIG. 35 is a schematic diagram showing division of a membership function.

The step 3203 of FIG. 32 is disposed to generate an observation table as a preparation for the computation of an effective grade Ri of each fuzzy rule; whereas the step 3204 represents the computation of the effective grade Ri. A description will be first given of the principle of decision of the effective grades $R_1, \ldots,$ and Ri for the respective fuzzy rules. FIG. 35 is a table of which contents are produced through quantization achieved on the membership functions of the consequents (then parts) of the respective fuzzy rules. In this operation, the membership functions are combined with each other to develop a maximum value (max) of the results of reasoning operations effected on the respective fuzzy rules so as to compute a barycenter of the composite function, thereby attaining the final result of the fuzzy inference. Assuming here as shown in FIG. 35 that the region of the membership functions is subdivided into N sub-regions to designate an intermediate point of each sub-region as $x_i$, the value of the composite function in the sub-region i is represented as $$\max_i (R_i f_{ij}(X_k)) \qquad (16)$$

where, Ri designates an effective grade (weight) of the fuzzy rule i and $f_{ij}(x_k)$ denotes a Value of the membership function for $x_k$ in the consequent of the fuzzy rule i in the j-th observation. The barycenter in the j-th observation takes a value of $$\frac{\sum_k \max_i (R_i f_{ij}(X_k)) X_k}{\sum_k \max_i (R_i f_{ij}(X_k))} \qquad (17)$$

The value of the effective grade Ri of the fuzzy rule i is determined such that the square sum of the difference between the barycenter value and a value $a_j$ obtained in the J-th observation develops a minimum value as follows.

$$T = \sum_i \left( \frac{\sum_k \max_i (R_i f_{ij}(X_k))(X_k - a_j)}{\sum_k \max_i (R_i f_{ij}(X_k))} \right) \to \min \qquad (18)$$

Figure 36:
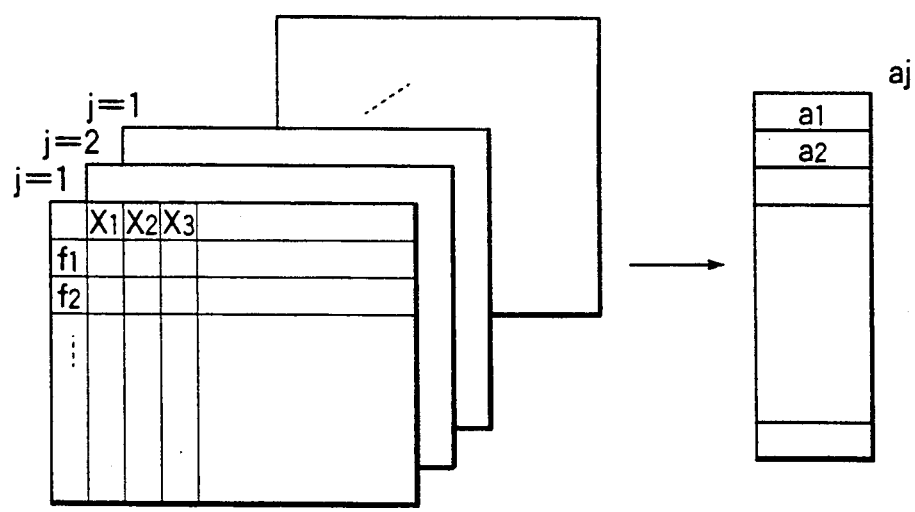
FIG. 36 is a diagram showing tables adopted to compute effective grades of fuzzy rules.
Figure 37:
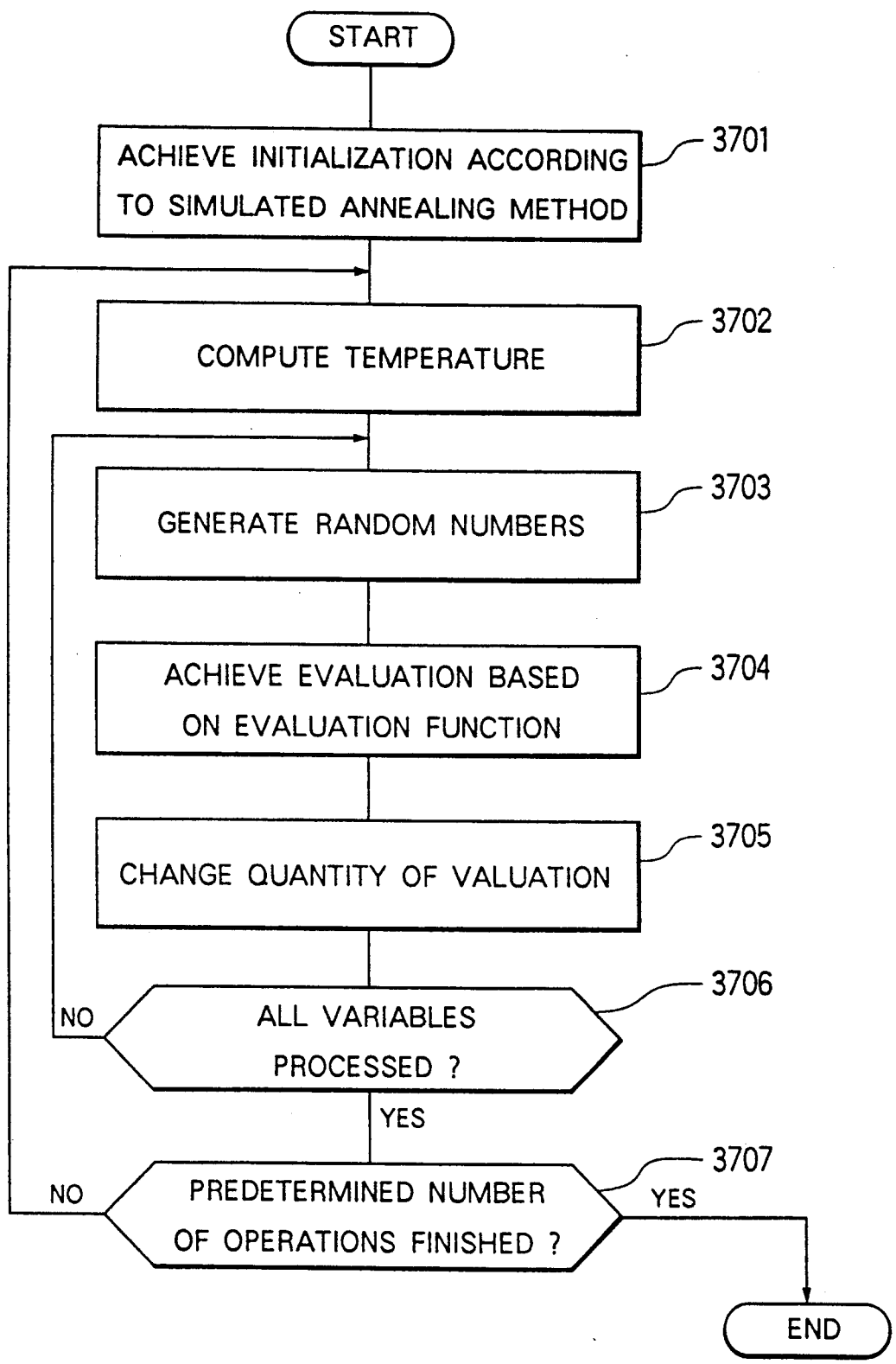
FIG. 37 is a flowchart showing the operation to compute effective grades of fuzzy rules.

Various known methods may be applied to the minimization of the value of the expression (18). FIG. 37 shows one of the method i.e. a simulated annealing method. The step 3403 generates an observation table (FIG. 36) necessary for the step 3404. In the observation table of FIG. 36, for each observation j, a countour of a membership function of each fuzzy rule is stored and values of the consequent attained in the observation j are loaded in the form of a table. The step 3204 computes, based on the data prepared in the step 3202, an optimal value of an effective grade Ri for each fuzzy rule according to the flowchart of FIG. 37. In the simulated annealing method, during a process of repetitious computations to attain the optimal value, the value of a temperature Tk is reduced as a variable related to the iteration count as follows $$Tk = T_0/\log(1+k) \qquad (19)$$

Moreover, a quantity of valuation $\Delta Ri$ of the unknown parameter is set according to a normalized random number N (0, $\alpha$Tk) so that the variance of the random numbers is proportional to the temperature Tk. Under these conditions, the value of the expression (17) is evaluated by changing the value of $\Delta Ri$. Based on the results, $$T(R_1, R_2, \ldots, R_i, \ldots)$$

$$T(R_1, R_2, \ldots, R_i + \Delta R_i, \ldots)$$

an influence of the evaluation function is computed with respect to $\Delta Ri$ as follows.

$$\Delta T(\Delta R_i) = T(R_1, R_2, \ldots, R_i 30 \Delta R_i, \ldots) - T(R_1, R_2, \ldots) \qquad (20)$$

Thereafter, the state of Ri is changed under the conditions $$\begin{aligned}
&\text{if } \Delta T(\Delta R_i) \leq 0 \text{ then } \quad R_i = R_i + \Delta R_i \\
&\text{if } \Delta T(\Delta R_i) > 0 \text{ then } \quad R_i = R_i + \Delta R_i \\
&\qquad\qquad\qquad\qquad\qquad (\text{probability} = 1 - \eta) \\
&\qquad\qquad\qquad\qquad\qquad R_i = R_i \\
&\qquad\qquad\qquad\qquad\qquad (\text{probability} = \eta)
\end{aligned} \qquad (21)$$

where, the probability $\eta$ is represented by a quantity proportional to exp $(-\Delta T(\Delta Ri)/Tk)$. FIG. 37 shows the procedure associated with the computation principle above. A step 3701 sets initial values to Ri (i=1, ...), T₀, the iteration count, etc. necessary for the computation in the simulated annealing method. A step 3702 varies the temperature depending on the expression (19). A step 3703 generates a valuation quantity $\Delta Ri$ proportional to the resultant temperature. A step 3704 achieves an evaluation of the objective function based on the expression (20). A step 3705 alters the state or situation quantity Ri according to the references presented by the expression (21). These operations are repeatedly accomplished for all values of the variable Ri (i=1, ...) for the number of times predetermined, thereby finally deciding the effective grades Ri of the respective fuzzy rules. Through the operations above, there can be developed the fuzzy rule learning system employing the time series data of FIG. 32.

In the description above, a membership function of a then part is obtained by use of a distribution of situations and membership functions of models registered to the system. However, this operation may be accomplished regardless of the membership functions of the models, namely, a new membership function of the then part may be attained such that the line of the function represented in a graph passes a point associated with the average value (barycenter) of conformity grades of the if part at the center point $\eta_i$ of each interval.

Moreover, according to the embodiment above, in the description of the operation to determine the parameters of the membership functions of the model and the effective grades Ri of the fuzzy rules based on the expressions (14) and (18), a single range is applied to all membership functions of the then parts. However, for example, in the determination of the membership functions of the consequents, the range of the membership functions may be subdivided into sub-ranges in the expression (14) as follows (the subranges may be of different sizes) to decide parameters for each subrange.

$$\left. \begin{array}{l} \sum_{i=1}^{m} \sum_{j=1}^{n_1} M(i,j) \cdot (f_j(\eta_i', a_1I, a_2I, \ldots, a_lI) - \delta_j')^2 \\ \sum_{i=1}^{m} \sum_{j=n_1}^{n_2} M(i,j) \cdot (f_j(\eta_i', a_1I, a_2I, \ldots, a_lI) - \delta_j')^2 \\ \sum_{i=1}^{m} \sum_{j=n_k}^{n_2} M(i,j) \cdot (f_j(\eta_i', a_1I, a_2I, \ldots, a_lI) - \delta_j')^2 \end{array} \right\} \quad (22)$$

This is also the case for the determination of the effective grades Ri of the fuzzy rules.

In addition, according to the embodiment above, the then part contains only one membership function. However, in a case where two or more membership functions are contained in the consequent, the fuzzy rule may be subdivided so that only one membership function exists in each then part.

In accordance with the present embodiment, even an unexperienced person or a beginner of the system with respect to objective system environments can determine a new effective grade of a fuzzy rule being used and availability of the fuzzy rule at the point of operation depending on a current value of a reference effective grade of a fuzzy rule; moreover, if necessary, by referencing a composite graphic representation of a membership function of a then part and a distribution of situations, which have been used for the evaluation.

We claim:

1. A fuzzy knowledge evaluation apparatus for use with a conventional fuzzy reasoning system in which a fuzzy reasoning is achieved by use of real data of a plurality of test cases based on fuzzy knowledge including a plurality of fuzzy rules each described in a format having an if part and a then part, and a plurality of membership functions defining meanings of respective propositions described in the if and then parts, said fuzzy knowledge evaluation apparatus comprising:

fuzzy knowledge base storage means for storing said plurality of fuzzy rules and said plurality of fuzzy membership functions;

fuzzy reasoning unit means connected to said fuzzy knowledge base storage means for executing the fuzzy reasoning by performing a fuzzy inference;

evaluating means operatively associated with the fuzzy reasoning unit means for evaluating a result obtained by calculating a plurality of relationships using each of: i) results of the fuzzy inference, ii) intermediate results of the inference, and iii) said real data, wherein the plurality of relationships include a relationship between the results of the inference and the real data, a relationship between the intermediate results of the inference and the real data, a relationship between the fuzzy rules, and a relationship between the membership functions and the real data; and, an output unit operatively associated with the fuzzy reasoning unit means for graphically outputting each of the relationships obtained by said evaluating means.

2. The fuzzy knowledge evaluation apparatus according to claim 1 wherein:

said evaluating means includes difference obtaining means for obtaining a difference between the inference results and the real data for each of the respective fuzzy rules; and wherein said fuzzy knowledge evaluation system further includes means for producing a distribution table indicating the relationship between the inference results and the real data based on differences in all cases obtained by said difference obtaining means.

3. A fuzzy knowledge evaluation apparatus for use with a conventional fuzzy reasoning system in which a fuzzy reasoning is achieved by use of real data of a plurality of test cases based on fuzzy knowledge including a plurality of fuzzy rules each described in a format having an if part and a then part, and a plurality of membership functions defining meanings of respective propositions described in the if and then parts, said fuzzy knowledge evaluation apparatus comprising:

fuzzy knowledge base storage means for storing said plurality of fuzzy rules and said plurality of fuzzy membership functions;

fuzzy reasoning unit means connected to said fuzzy knowledge base storage means for executing the fuzzy reasoning by performing a fuzzy inference;

evaluating means operatively associated with the fuzzy reasoning unit means for evaluating a result obtained by calculating a plurality of relationships using each of: i) results of the fuzzy inference, ii) intermediate results of the inference, and iii) said real data, wherein the plurality of relationships include a relationship between the results of the inference and the real data, a relationship between the intermediate results of the inference and the real data, a relationship between the fuzzy rules, and a relationship between the membership functions and the real data, said evaluating means including:
- means for obtaining, for each of the fuzzy rules, a grade of rule representing an adequacy thereof based on the membership functions associated with the respective if parts of the fuzzy rules;
- means for obtaining representative values of the membership functions related to the respective then parts of the fuzzy rules for all the cases;
- means for obtaining differences between the representative values and the real data; and,
- means for producing a table indicating the relationship between the rule and the grade of the rule on the basis of the representative values obtained by said representative values obtaining means and a grade of rule obtained in the course of executing the fuzzy inference; and,
- an output unit operatively associated with the fuzzy reasoning unit means for graphically outputting each of the relationships obtained by said evaluating means.

4. A fuzzy knowledge evaluation apparatus for use with a conventional fuzzy reasoning system in which a fuzzy reasoning is achieved by use of real data of a plurality of test cases based on fuzzy knowledge including a plurality of fuzzy rules each described in a format having an if part and a then part, and a plurality of membership functions defining meanings of respective propositions described in the if and then parts, said fuzzy knowledge evaluation apparatus comprising:
- fuzzy knowledge base storage means for storing said plurality of fuzzy rules and said plurality of fuzzy membership functions;
- fuzzy reasoning unit means connected to said fuzzy knowledge base storage means for executing the fuzzy reasoning by performing a fuzzy inference;
- evaluating means operatively associated with the fuzzy reasoning unit means for evaluating a result obtained by calculating a plurality of relationships using each of: i) results of the fuzzy inference, ii) intermediate results of the inference, and iii) said real data, wherein the plurality of relationships include a relationship between the results of the inference and the real data, a relationship between the intermediate results of the inference and the real data, a relationship between the fuzzy rules, and a relationship between the membership functions and the real data, said evaluating means including:
  - means for attaining an influence power of each of the fuzzy rules with respect to the fuzzy reasoning results for all the cases;
  - means for assigning values of order to the respective fuzzy rules in a sequence of the magnitude of the obtained influence power for all the cases; and
  - means for producing a table indicating the relationship between the rules on basis of the orders of all the cases in the fuzzy rules; and,
- an output unit operatively associated with the fuzzy reasoning unit means for graphically outputting each other relationships obtained by said evaluating means.

5. A fuzzy knowledge evaluation apparatus for use with a conventional fuzzy reasoning system in which a fuzzy reasoning is achieved by use of real data of a plurality of test cases based on fuzzy knowledge including a plurality of fuzzy rules each described in a format having an if part and a then part, and a plurality of membership functions defining meanings of respective propositions described in the if and then parts, said fuzzy knowledge evaluation apparatus comprising:
- fuzzy knowledge base storage means for storing said plurality of fuzzy rules and said plurality of fuzzy membership functions;
- fuzzy reasoning unit means connected to said fuzzy knowledge base storage means for executing the fuzzy reasoning by performing a fuzzy inference;
- evaluating means operatively associated with the fuzzy reasoning unit means for evaluating a result obtained by calculating a plurality of relationships using each of: i) results of the fuzzy inference, ii) intermediate results of the inference, and iii) said real data, wherein the plurality of relationships include a relationship between the results of the inference and the real data, a relationship between the intermediate results of the inference and the real data, a relationship between the fuzzy rules, and a relationship between the membership functions and the real data, said evaluating means including:
  - means for superimposing the real data used as input data during performing the fuzzy inference on the membership functions of the if part; and
  - means for superimposing the reasoning results on the membership functions of the then part, a result of the superimposition by said means indicating a relationship between the membership function and the real data; and,
- an output unit operatively associated with the fuzzy reasoning unit means for graphically outputting each of the relationships obtained by said evaluating means.

6. A fuzzy knowledge evaluation and modification system for use in a fuzzy reasoning system of known type in which a fuzzy reasoning is achieved by use of fuzzy knowledge including i) fuzzy rules described in a format of an if . . . part and a then . . . part, and ii) membership functions defining meanings of respective propositions described in the if . . . and then . . . parts, said fuzzy knowledge evaluation and modification system comprising:
- fuzzy knowledge base means for storing said fuzzy rules and membership functions;
- a fuzzy reasoning unit for performing said fuzzy reasoning;
- time series data storage means for storing actual time series data;
- processing means for processing, based on the actual time series data stored in said time series data storage means and collected from a field selected as an object of the fuzzy reasoning, values of the if . . . parts of the fuzzy rules, thereby attaining a grade related to the if . . . parts;
- situation value attaining means for attaining situation values of the then . . . parts of the fuzzy rules based on the actual time series data;
- situation producing means for producing a distribution of situations including a plurality of pairs each comprising the grade related to the if . . . parts and the situation value of the then . . . parts;

grade calculating means for calculating either one of an effective grade and an inconformity grade of the fuzzy rules based on the generated distribution of situations and the membership functions of the then . . . parts of the fuzzy rules; and display means for displaying the calculated grade.

7. The fuzzy knowledge evaluation and modification system according to claim 6 wherein said grade calculating means includes means for adopting, as the inconformity grade, an average distance between the membership functions of the then . . . parts of the fuzzy rules and the distribution of situations.

8. The fuzzy knowledge evaluation and modification system according to claim 6 further including:
means for displaying the calculated effective grade as a reference effective grade;
means for specifying therefrom a new availabililty grade;
means for employing the specified grade as a new availability grade of the fuzzy rules; and,
means for registering thereto the availability grade as an effective grade of the fuzzy rule.

9. The fuzzy knowledge evaluation and modification system according to claim 6 further including:
means for storing therein an availability flag indicating whether or not a one of the fuzzy rules can be used;
means for determining whether or not a one of the fuzzy rules is used depending on a condition of the availability flag thereof; and
means for modifying the availability flag.

10. The fuzzy knowledge evaluation and modification system according to claim 6 wherein said situation producing means includes:
means for subdividing the actual time series data in association with a predetermined period; and
means for assigning weights respectively to the subdivided actual time series data.

11. A fuzzy knowledge evaluation method for use in a conventional fuzzy reasoning system of known type in which a fuzzy reasoning is achieved by use of real test data of a plurality of real test cases based on fuzzy knowledge including a plurality of fuzzy rules each described in a format of an if part and a then part and a plurality of membership functions defining meanings of respective propositions described in the if and then parts, said fuzzy knowledge evaluation method comprising the steps of:
executing the fuzzy reasoning by performing a fuzzy inference in the fuzzy reasoning system using the plurality of fuzzy rules of the fuzzy knowledge to obtain a result;
obtaining, in an evaluating means of said fuzzy reasoning system, a plurality of relationships using each of: i) the result obtained by the fuzzy inference, ii) intermediate results thereof and iii) the real data, wherein the plurality of relationships include a relationship between the results of inference and the real data, a relationship between the intermediate results of the inference and the real data, a relationship between first rules and grades of the first rules, a relationship between said fuzzy rules, and a relationship between first membership functions and the real data;
graphically outputting each of said plurality of relationships obtained by said evaluating means as a graphic display representing adequacy of said fuzzy knowledge; and,
adjusting said fuzzy knowledge based on said adequacy to obtained adjusted fuzzy knowledge.

12. The fuzzy knowledge evaluation method according to claim 11, wherein:
said obtaining step includes obtaining the relationship between the results of inference and the real data for each of the respective fuzzy rules; and wherein
said outputting step includes the step of producing a distribution table indicating a difference relationship between the inference results and the real data for all cases obtained by said obtaining step.

13. A fuzzy knowledge evaluation method for use in a conventional fuzzy reasoning system of known type in which a fuzzy reasoning is achieved by use of real test data of a plurality of real test cases based on fuzzy knowledge including a plurality of fuzzy rules each described in a format of an if part and a then part and a plurality of membership functions defining meanings of respective propositions described in the if and then parts, said fuzzy knowledge evaluation method comprising the steps of:
executing the fuzzy reasoning by performing a fuzzy inference in the fuzzy reasoning system using the plurality of fuzzy rules of the fuzzy knowledge to obtain a result;
obtaining, in an evaluating means of said fuzzy reasoning system, a plurality of relationships using each of: i) the result obtained by the fuzzy inference, ii) intermediate results thereof and iii) the real data, wherein the plurality of relationships include a relationship between the results of inference and the real data, a relationship between the intermediate results of the inference and the real data, a relationship between first rules and grades of the first rules, a relationship between said fuzzy rules, and a relationship between first membership functions and the real data, said obtaining step including:
obtaining, for each of the fuzzy rules, a grade of rule representing an adequacy thereof based on the membership functions associated with the respective if parts of the fuzzy rules;
attaining representative values of the membership functions related to the respective then parts of each of the fuzzy rules;
obtaining differences between the representative values and the real data; and,
producing a table indicating the relationship between the first rules and the first grades of the first rules on the basis of the representative values obtained by said representative value attaining step and the grade of rule obtained in the executing of the fuzzy inference;
graphically outputting each of said plurality of relationships obtained by said evaluating means as a graphic display representing adequacy of said fuzzy knowledge; and,
adjusting said fuzzy knowledge based on said adequacy to obtained adjusted fuzzy knowledge.

14. A fuzzy knowledge evaluation method for use in a conventional fuzzy reasoning system of known type in which a fuzzy reasoning is achieved by use of real test data of a plurality of real test cases based on fuzzy knowledge including a plurality of fuzzy rules each described in a format of an if part and a then part and a plurality of membership functions defining meanings of respective propositions described in the if and then parts, said fuzzy knowledge evaluation method comprising the steps of:

executing the fuzzy reasoning by performing a fuzzy inference in the fuzzy reasoning system using the plurality of fuzzy rules of the fuzzy knowledge to obtain a result;

obtaining, in an evaluating means of said fuzzy reasoning system, a plurality of relationships using each of: i) the result obtained by the fuzzy inference, ii) intermediate results thereof and iii) the real data, wherein the plurality of relationships include a relationship between the results of inference and the real data, a relationship between the intermediate results of the inference and the real data, a relationship between first rules and grades of the first rules, a relationship between said fuzzy rules, and a relationship between first membership functions and the real data, said obtaining step including:

attaining an influence power of each of the fuzzy rules with respect to the fuzzy reasoning results for all the cases;

assigning values of order to the respective fuzzy rules in a sequence of the magnitude of the obtained influence power for all the cases; and producing a table indicating the relationship between the rules on the basis of the orders of all the cases in the fuzzy rules;

graphically outputting each of said plurality of relationships obtained by said evaluating means as a graphic display representing adequacy of said fuzzy knowledge; and, adjusting said fuzzy knowledge based on said adequacy to obtained adjusted fuzzy knowledge.

15. A fuzzy knowledge evaluation method for use in a conventional fuzzy reasoning system of known type in which a fuzzy reasoning is achieved by use of real test data of a plurality of real test cases based on fuzzy knowledge including a plurality of fuzzy rules each described in a format of an if part and a then part and a plurality of membership functions defining meanings of respective propositions described in the if and then parts, said fuzzy knowledge evaluation method comprising the steps of:

executing the fuzzy reasoning by performing a fuzzy inference in the fuzzy reasoning system using the plurality of fuzzy rules of the fuzzy knowledge to obtain a result;

obtaining, in an evaluating means of said fuzzy reasoning system, a plurality of relationships using each of: i) the result obtained by the fuzzy inference, ii) intermediate results thereof and iii) the real data, wherein the plurality of relationships include a relationship between the results of inference and the real data, a relationship between the intermediate results of the inference and the real data, a relationship between first rules and grades of the first rules, a relationship between said fuzzy rules, and a relationship between first membership functions and the real data;

graphically outputting each of said plurality of relationships obtained by said evaluating means as a graphic display representing adequacy of said fuzzy knowledge, said outputting step including:

superimposing the real data used as input data during performance of the fuzzy inference on the membership functions of the if part; and superimposing the reasoning results on the membership functions of the then part a result of the superimposing steps indicating a relationship between the membership functions and the real data; and, adjusting said fuzzy knowledge based on said adequacy to obtained adjusted fuzzy knowledge.

16. A fuzzy knowledge evaluation and modification method performed in a common fuzzy reasoning apparatus of known type in which a fuzzy reasoning is achieved in a host computer by use of fuzzy knowledge including i) fuzzy rules described in a format of an if . . . part and a then . . . part and ii) membership functions defining meanings of respective propositions described in the if . . . and then . . . parts, said fuzzy knowledge evaluation and modification method comprising the steps of:

processing in said host computer, based on actual time series data from a field selected as an object of the fuzzy reasoning, values of the if . . . parts of the fuzzy rules, thereby attaining a grade related to the if . . . parts;

attaining in said host computer situation values of the then . . . parts of the fuzzy rules based on the actual time series data;

producing a distribution of situations including a plurality of pairs each comprising the grade related to the if . . . parts and the situation value of the then . . . parts;

calculating either one of an effective grade and an inconformity grade of the fuzzy rules based on the generated distribution of situations and the membership functions of the then . . . parts of the fuzzy rules;

displaying, on a terminal operatively associated with said host computer, the calculated grade; and, modifying said fuzzy knowledge using a fuzzy rule editor operatively associated with said host computer based on said displayed calculated grade.

17. The fuzzy knowledge evaluation and modification method according to claim 16 wherein said step of calculating the grade includes the step of adopting, as the inconformity grade, an average distance between the membership functions of the then . . . parts of the fuzzy rules and the distribution of situations.

18. The fuzzy knowledge evaluation and modification method according to claim 16 further including the steps of:

displaying the calculated effective grade as a reference effective grade;

specifying therefrom a new availability grade;

employing the specified grade as a new availability grade of the fuzzy rules; and registering thereto the availability grade as an effective grade of the fuzzy rules.

19. The fuzzy knowledge evaluation and modification method according to claim 16 further including:

storing a flag indicating whether or not a one of the fuzzy rules can be used;

determining whether or not a one of the fuzzy rules is used depending on a condition of the availability flag thereof; and modifying the availability flag.

20. The fuzzy knowledge evaluation and modification method according to claim 16 wherein the step of producing the distribution of the updating system includes:

subdividing the actual time series data in association with a predetermined period; and assigning weights respectively to subdivided actual time series data.

* * * * *

UNITED STATES PATENT AND TRADEMARK OFFICE
CERTIFICATE OF CORRECTION

PATENT NO. : 5,267,348
DATED : November 30, 1993
INVENTOR(S) : Ryuko Someya, et al.

It is certified that error appears in the above-identified patent and that said Letters Patent is hereby corrected as shown below:

Claim 4, column 25, line 67, delete "other" and substitute therefor --of the--.

Claim 8, column 27, line 17, delete "availabililty" and substitute therefor --availability--.

Signed and Sealed this

Seventh Day of June, 1994

*Attest:*

BRUCE LEHMAN

*Attesting Officer*   *Commissioner of Patents and Trademarks*